(12) United States Patent
Abiko et al.

(10) Patent No.: US 7,272,183 B2
(45) Date of Patent: Sep. 18, 2007

(54) IMAGE PROCESSING DEVICE, METHOD AND STORAGE MEDIUM THEREOF

(75) Inventors: Yukihiro Abiko, Kawasaki (JP); Tetsuo Koezuka, Kawasaki (JP); Hideo Kato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 438 days.

(21) Appl. No.: 09/995,781

(22) Filed: Nov. 29, 2001

(65) Prior Publication Data

US 2002/0036717 A1    Mar. 28, 2002

Related U.S. Application Data

(63) Continuation of application No. PCT/JP99/04558, filed on Aug. 24, 1999.

(51) Int. Cl.
H04N 7/12 (2006.01)
H04N 11/02 (2006.01)

(52) U.S. Cl. ............... 375/240.16; 375/240.15; 348/700

(58) Field of Classification Search ........... 348/699, 348/700; 375/240.25, 240.11, 240.14, 240.15; 345/723; 382/235, 236
See application file for complete search history.

(56) References Cited

U.S. PATENT DOCUMENTS

| | | | |
|---|---|---|---|
| 5,168,356 A * | 12/1992 | Acampora et al. | 375/240.15 |
| 5,642,174 A * | 6/1997 | Kazui et al. | 348/700 |
| 5,774,593 A * | 6/1998 | Zick et al. | 382/236 |
| 5,847,767 A | 12/1998 | Ueda | 348/423 |
| 5,911,008 A | 6/1999 | Niikura et al. | |
| 6,473,459 B1 * | 10/2002 | Sugano et al. | 375/240.16 |
| 6,735,253 B1 * | 5/2004 | Chang et al. | 375/240.16 |

FOREIGN PATENT DOCUMENTS

JP    A-2-174387    7/1990

(Continued)

OTHER PUBLICATIONS

'Rapid scene analysis on compressed video' by Boon-Lock Yeo and Bede Liu; Circuits and Systems for Video Technology, IEEE Transactions on, vol. 5, Issue: 6 , Dec. 1995; pp. 533-544□□.*

(Continued)

*Primary Examiner*—Gims Philippe
*Assistant Examiner*—Erick Rekstad
(74) *Attorney, Agent, or Firm*—Staas & Halsey LLP

(57) ABSTRACT

An information collecting unit reads encoded moving image data from an information storing unit, decodes part of the moving image data, extracts the number and the magnitudes of motion vectors, the square measure of a region having a low correlation with a preceding/succeeding frame, etc. for each frame, and outputs these items of scene change information to an evaluation function calculating unit. The evaluation function calculating unit calculates the value of a predetermined evaluation function based on the scene change information, and outputs the calculated value to a scene change determining unit. The scene change determining unit determines a frame of a scene change by making a comparison between the calculated value and a threshold value. A scene change information storing unit stores the scene change information used for the determination.

22 Claims, 29 Drawing Sheets

FOREIGN PATENT DOCUMENTS

| | | |
|---|---|---|
| JP | A-4-10788 | 1/1992 |
| JP | A-6-54315 | 2/1994 |
| JP | A-6-153146 | 5/1994 |
| JP | 7-264590 | 10/1995 |
| JP | A-9-214975 | 8/1997 |
| JP | A-10-23421 | 1/1998 |
| JP | 11-8854 | 1/1999 |
| JP | A-11-8854 | 1/1999 |

OTHER PUBLICATIONS

'Scene change detection in a MPEG compressed video sequence' by J. Meng, V. Juan, and S.F. Chang; Digital Video Compression: Algorithms and Technol., vol. SPIE-2419; Feb. 1995; pp. 14-25.*

Y. Niikura et al., "Scene Change Detection from MPGE Coded Data", IEEJ, CMN-97-37-43, Sep. 25, 1997, pp. 7-12.

S. Yamada et al., "A Scene-Change Detection Method For The Video Including The Special Effetcs", ITE, Apr. 21, 1994, pp. 21-26.

* cited by examiner

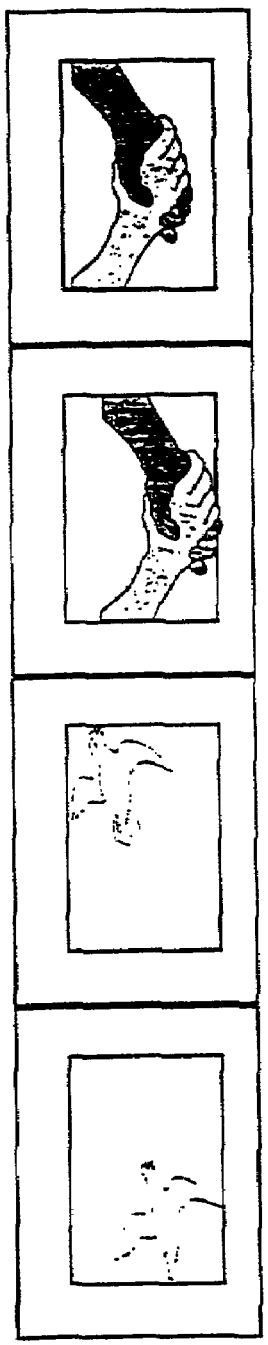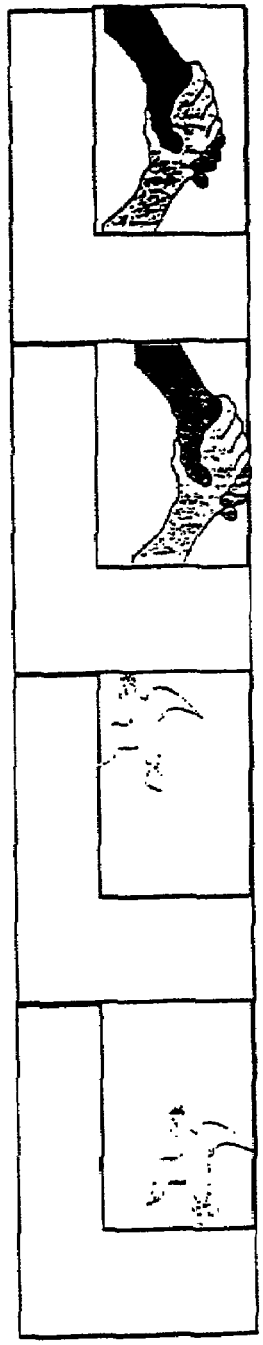
FIG. 7A — SCENE CHANGE — WHEN BEING DISPLAYED IN CENTER OF SCREEN
FIG. 7B — SCENE CHANGE — WHEN BEING DISPLAYED IN LOWER RIGHT PORTION OF SCREE IF i FRAME IS SCENE CHANGE POINT

| FRAME NO. | PICTURE TYPE | NUMBER OF FORWARD PREDICTION MOTION VECTORS | NUMBER OF BACKWARD PREDICTION MOTION VECTORS |
|---|---|---|---|
| i | BIDIRECTIONALLY PREDICTED FRAME | SMALL | LARGE |
| i+1 | BIDIRECTIONALLY PREDICTED FRAME | SMALL | LARGE |

F I G. 1 2

IF i+1 FRAME IS SCENE CHANGE POINT

| FRAME NO. | PICTURE TYPE | NUMBER OF FORWARD PREDICTION MOTION VECTORS | NUMBER OF BACKWARD PREDICTION MOTION VECTORS |
|---|---|---|---|
| i | BIDIRECTIONALLY PREDICTED FRAME | LARGE | SMALL |
| i+1 | BIDIRECTIONALLY PREDICTED FRAME | SMALL | LARGE |

F I G. 1 3

IF i+2 FRAME IS SCENE CHANGE POINT

| FRAME NO. | PICTURE TYPE | NUMBER OF FORWARD PREDICTION MOTION VECTORS | NUMBER OF BACKWARD PREDICTION MOTION VECTORS |
|---|---|---|---|
| i | BIDIRECTIONALLY PREDICTED FRAME | LARGE | SMALL |
| i+1 | BIDIRECTIONALLY PREDICTED FRAME | LARGE | SMALL |

F I G. 1 4

IF i FRAME IS SCENE CHANGE POINT

| FRAME NO. | PICTURE TYPE | NUMBER OF FORWARD PREDICTION MOTION VECTORS | NUMBER OF BACKWARD PREDICTION MOTION VECTORS | BIDIRECTIONALLY PREDICTED REGION |
|---|---|---|---|---|
| i | BIDIRECTIONALLY PREDICTED FRAME | SMALL | LARGE | MINIMAL |
| i+1 | BIDIRECTIONALLY PREDICTED FRAME | SMALL | LARGE | MINIMAL |
| i+2 | FORWARD PREDICTED FRAME | SMALL | NONE | NONE |

F I G. 1 5

IF i+1 FRAME IS SCENE CHANGE POINT

| FRAME NO. | PICTURE TYPE | NUMBER OF FORWARD PREDICTION MOTION VECTORS | NUMBER OF BACKWARD PREDICTION MOTION VECTORS | BIDIRECTIONALLY PREDICTED REGION |
|---|---|---|---|---|
| i | BIDIRECTIONALLY PREDICTED FRAME | LARGE | SMALL | MINIMAL |
| i+1 | BIDIRECTIONALLY PREDICTED FRAME | SMALL | LARGE | MINIMAL |
| i+2 | FORWARD PREDICTED FRAME | SMALL | NONE | NONE |

F I G. 1 6

IF i+2 FRAME IS SCENE CHANGE POINT

| FRAME NO. | PICTURE TYPE | NUMBER OF FORWARD PREDICTION MOTION VECTORS | NUMBER OF BACKWARD PREDICTION MOTION VECTORS | BIDIRECTIONALLY PREDICTED REGION |
|---|---|---|---|---|
| i | BIDIRECTIONALLY PREDICTED FRAME | LARGE | SMALL | MINIMAL |
| i+1 | BIDIRECTIONALLY PREDICTED FRAME | LARGE | SMALL | MINIMAL |
| i+2 | FORWARD PREDICTED FRAME | SMALL | NONE | NONE |

F I G. 17

FLOW OF PROCESS WHEN SCENE CHANGE IS NEWLY DETECTED (IN CASE OF M=3)

IMAGE PROCESSING DEVICE, METHOD AND STORAGE MEDIUM THEREOF

CROSS REFERENCE TO RELATED APPLICATION

This application is a continuation of international PCT application No. PCT/JP99/04558 filed on Aug. 24, 1999.

BACKGROUND OF THE INVENTION

1. Field of the Invention

The present invention relates to a moving image processing device automatically detecting a scene change from a moving image that is compressed with inter-frame prediction encoding, and a method thereof.

2. Description of the Related Art

In recent years, inter-frame prediction encoding methods such as H.261, ISO/IEC MPEG1, ISO/IEC MPEG2, etc. have been internationally standardized to realize the storage and the transmission of a digital moving image having an enormous amount of information. Moving image recording/reproducing devices encoding/decoding a moving image are developed with these methods. Additionally, moving image data conforming to a Video CD standard using the ISO/IEC MPEG1 has become popular on a worldwide scale. Furthermore, the ISO/IEC MPEG2 is used to record digital video signals onto a DVD.

In the meantime, the capacity of a storage medium (such as a hard disk, a magneto-optical disk, etc.) recording a moving image has been becoming large, and a long-duration moving image can be stored onto the storage medium and processed. Specific applications include moving image editing, video-on-demand, etc.

To edit a moving image, capabilities for assisting image search or editing, such as index generation from a moving image, etc. are essential. For the index generation, scene change detection is effective. Since a stream of a moving image for which the inter-frame prediction encoding is performed is a bit string of encoded data, a scene change cannot be detected from the bit stream directly. Accordingly, a variety of methods and devices detecting a scene change are conventionally proposed.

The scene change detecting methods are typified by a method using differential image information between frames, a method using discrete cosine transform coefficient (DCT coefficient) information, a method using color information, a method using data encoding amount information, a method using motion vector information, a method using macroblock number information, and a method combining these items of information. With these methods, however, if the scale of a particular circuit for detecting a scene change becomes large, the cost of a moving image reproducing device increases.

There are few conventional methods quickly detecting a scene change, for example, the following methods can be cited.

(1) A method examining the amount of encoding of a motion vector.
(2) A method detecting a scene change after once decoding encoded data completely, and restoring a moving image.

Examples of such a method include a method using differential image information between frames or color information, and a method obtaining a motion vector aside from a motion vector for motion compensation and using the obtained motion vector.

(3) A method partially decoding a moving image after being encoded, and quickly detecting a scene change with the partial data.

Examples of this method include a method using discrete cosine transform coefficient information, data encoding amount information, motion vector information, and macroblock information.

With the above described method (1), the scale applied to all motion vectors within a frame and the magnitude of an individual vector are separately encoded, which causes a scene change to be erroneously detected. This is because the motion vectors are difficult to reflect only with the amount of encoding of a motion vector.

With the above described method (2) requiring encoded data of a moving image to be completely decoded, a storage device for storing data after being decoded, and an arithmetic operation circuit for performing an arithmetic operation between pixels within a frame are necessary, which leads to an increase in the scale and the cost of circuitry. Furthermore, since at least a processing time equivalent to a reproduction process is required to decode encoded data, it is difficult to speed up scene change detection.

Although the detection processing can be made faster with the above described method (3) than that with the above described method (2), the following problems are posed.

Firstly, with the method using discrete cosine transform coefficient information, a discrete cosine transform coefficient is information that is possessed by each constituent element of an image. Therefore, the image must be decoded to just one step before the restorion of the image, and a considerable amount of time is required for decoding.

With the method using data encoding amount information, a frame with a large amount of data encoding is regarded as a scene change, and the processing can be made fast because only the amount of data encoding is used. However, the amount of data encoding for a frame becomes large also when the motion of a subject is active, not when a scene changes. Therefore, a scene change is prone to be erroneously detected.

The method using motion vector information focuses only on the magnitudes of motion vectors. Accordingly, even if there is an image constituent element having a motion vector the magnitude of which is 0, this information is not reflected. Therefore, information effective for detecting a scene change is not fully utilized. For this reason, this method lacks the accuracy of scene change detection, and a motion vector must be used by being combined with other information, leading to an increase in the processing time required for detecting a scene change.

Additionally, for a long-duration moving image, the number of scene changes included increases. However, most conventional scene change detection methods aim at optimizing encoding. To achieve this aim, all detected scene changes must be presented. If the number of detected scene changes is very large, viewing all of the detected scene changes as auxiliary information decreases operational efficiency when a moving image is searched or edited.

Furthermore, if a scene change is used as auxiliary information for searching or editing a moving image, the number of scene changes according to the reproduction time of a moving image, or a scene change of great importance must be presented. Besides, the degree of the importance must be changed depending on the contents (genre) of a moving image. However, there are no conventional methods presenting such information.

SUMMARY OF THE INVETION

An object of the present invention is to provide a moving image processing device that can quickly and accurately detect a scene change from a moving image without completely decoding the moving image that is compressed with inter-frame prediction encoding. Another object of the present invention is to provide a moving image processing device that can specify the number of detected scene changes. A further object of the present invention is to provide a moving image processing device that preferentially detects a scene change of great importance according to the contents (genre) of a moving image.

A moving image processing device according to a first preferred mode of the present invention comprises the following units.

An information collecting unit collects first information about a motion vector for each frame from moving image data that is compressed with inter-frame prediction encoding, and also collects second information about the correlation with a preceding/succeeding frame without decoding an image for each frame. The first information is, for example, the number and the magnitudes of motion vectors, whereas the second information is, for example, the square measure of a region having a low correlation with a preceding/succeeding frame.

An evaluation function calculating unit calculates the value of an evaluation function that includes the first and the second information, which are collected by the information collecting unit, as parameters. The evaluation function is, for example, a function the parameters of which are determined according to the appearance cycle of an intra-frame encoded frame or a forward predicted frame in the encoded moving image data.

A scene change determining unit determines a scene change by making a comparison between the value of the evaluation function calculated by the evaluation function calculating unit and a threshold value. The scene change determining unit determines a specified number of scene changes, for example, by changing the threshold value.

The information collecting unit collects the first information about a motion vector of each frame, or example, from first header information, which is added in units of frames of the compressed moving image data, and second header information, which is added in units of constituent elements of the frame, without decoding the image within the frame. Additionally, the information collecting unit collects the second information about the correlation with a frame preceding/succeeding each frame, for example, from the first header information, which is added in units of frames of the compressed moving image data, and the second header information, which is added in units of constituent elements of the frame, without decoding the image within the frame.

With the moving image processing device having the above described configuration according to the first preferred mode, the second information about the correlation with a preceding/succeeding frame is collected without decoding an image in addition to the first information about a motion vector for each frame, the value of an evaluation function including the first and the second information as parameters is calculated, and a comparison between the calculated value and a threshold value is made, so that a scene change is determined. Therefore, a scene change can be detected more quickly and accurately in comparison with the conventional methods.

The information collecting unit further collects, for example, a scene change interval. The evaluation function calculating unit calculates the value of an evaluation function including the scene change interval as a parameter in addition to the first and the second information. By adding the scene change interval as a parameter of an evaluation function as described above, the accuracy of scene change detection can be improved.

Additionally, the evaluation function is, for example, a function into which parameters are linearly combined by using coefficients that are assigned to the respective parameters. In this case, the evaluation function calculating unit changes the coefficients of the respective parameters of the evaluation function according to the contents of moving image data from which a scene change is detected.

By changing the coefficients of parameters of an evaluation function according to the contents (genre) of a moving image as described above, a scene change can be detected according to the characteristic of each moving image type. As a result, a scene change can be accurately detected for a moving image of every genre.

Additionally, the evaluation function is defined to be a function having an offset constant, so that it becomes possible to accurately detect a scene change by adjusting the constant also for a reduced image such as an inserted and synthesized image, etc.

Furthermore, the information collecting unit may be configured to collect, for example, the number of bidirectionally predicted regions having both a forward prediction motion vector and a backward prediction motion vector for each frame, and to output the first and the second information to the evaluation function calculating unit as parameters of the evaluation function only for a frame within a frame group which satisfies a condition that the numbers of bidirectionally predicted regions in consecutive frames are small. As a result, the number of times that the evaluation function calculating unit performs an arithmetic operation can be reduced. Since the evaluation function calculating unit performs an arithmetic operation only for a frame with a great possibility of a scene change within a frame group, the processing speed can be improved while maintaining the accuracy of scene change detection.

Still further, the information collecting unit is configured, for example, to output the number of bidirectionally predicted regions having both a forward prediction motion vector and a backward prediction motion vector in each frame within the frame group to the evaluation function calculating unit as a parameter of the evaluation function, whereby the evaluation function can be defined as a more suitable function. In consequence, the accuracy of scene change detection can be further improved.

Still further, the information collecting unit is configured to collect an appearance interval of a frame, which becomes a scene change, within a frame group that satisfies a condition that the numbers of bidirectionally predicted regions in consecutive frames are small, and to output the appearance interval of the frame as a parameter of the evaluation function to the evaluation function calculating unit, thereby further improving the accuracy of scene change detection.

A moving image processing device according to a second preferred mode of the present invention comprises a scene change information storing unit storing the first information, the second information, and the frame appearance interval as scene change information in addition to the units comprised by the moving image processing device according to the first preferred mode.

With the moving image processing device according to the second preferred mode, the evaluation function calculating unit calculates the value of an evaluation function by using the scene change information stored in the scene change information storing unit, and the scene change determining unit determines a scene change by making a comparison between the calculated value of the evaluation function and a threshold value, so that the speed of scene change detection can be further improved.

The scene change determining unit determines a specified number of scene changes, for example, by changing the threshold value. In this way, scene changes the number of which is specified by a user can be presented to the user.

A moving image processing device according to a third preferred mode of the present invention comprises a scene change information storing unit storing, as scene change information, the first information, the second information, and the appearance interval of a frame, which becomes a scene change, within a frame group which satisfies a condition that the numbers of bidirecitonally predicted regions in consecutive frames are small, in addition to the units comprised by the moving image processing device according to the first preferred mode.

With such a configuration, for example, the evaluation function calculating unit calculates the value of an evaluation function by using the scene change information read from the scene change information storing unit, and the scene change determining unit determines a scene change by making a comparison between the calculated value of the evaluation function and a threshold value.

With the moving image processing device according to the third preferred mode of the present invention, a scene change is detected by using the value of an evaluation function including the appearance interval of a frame, which becomes a scene change, as a parameter in addition to the first and the second information of a frame within a frame group that satisfies the condition that the numbers of bidirectionally predicted regions in consecutive frames are small, thereby realizing higher detection accuracy of a scene change than that with the moving image processing device according to the second preferred mode. Furthermore, by changing the threshold value, scene changes the number of which is equal to the number specified by a user can be presented likewise the second preferred mode.

A moving image processing device according to a fourth preferred mode of the present invention comprises a decoding unit restoring an image within a frame of a scene change determined by the scene change determining unit, in addition to the units comprised by the moving image processing device according to the first preferred mode.

With the moving image processing device according to the fourth preferred mode, an image of a scene change can be decompressed.

A moving image processing method according to a fifth preferred mode of the present invention comprises the steps of: (a) collecting first information about a motion vector for each frame from moving image data that is compressed with inter-frame prediction encoding; (b) collecting second information about the correlation with a preceding/succeeding frame without decoding an image for each frame; (c) calculating the value of an evaluation function including the first and the second information as parameters; and (d) determining a scene change by making a comparison between the calculated value of the evaluation function and a threshold value. The evaluation function is, for example, a function into which parameters are linearly combined with coefficients that are assigned to the respective parameters. Furthermore, the evaluation function is, for example, a function the parameters of which are determined according to an appearance cycle of an intra-frame encoded frame or a forward predicted frame in the encoded moving image data.

A moving image processing method according to a sixth preferred mode of the present invention comprises the step of (e) collecting a scene change interval, wherein the evaluation function including the scene change interval as a parameter is calculated in the step (c), in addition to the above described steps (a) through (d).

A moving image processing method according to a seventh preferred mode of the present invention comprises the step of (f) storing the first information, the second information, and the scene change interval as scene change information, in addition to the above described steps (a) through (e).

A moving image processing method according to an eighth preferred mode of the present invention comprises the steps of: (g) calculating the value of an evaluation function by using the stored scene change information; and (h) determining a scene change by making a comparison between the calculated value of the evaluation function and a threshold value, in addition to the above described steps (a) through (f).

A moving image processing method according to a ninth preferred mode of the present invention comprises the step of (i) changing the threshold value so that the number of scene changes, which is determined in the step (c), becomes equal to a specified number, in addition to the above described steps (a) through (h).

A moving image processing method according to a tenth preferred mode of the present invention comprises the step of (e1) changing the coefficients of respective parameters of the evaluation function according to the contents of moving image data from which a scene change is detected, in addition to the above described steps (a) through (d).

A moving image processing method according to an eleventh preferred mode of the present invention comprises the step of (e2) collecting the number of bidirectionally predicted regions having both a forward prediction motion vector and a backward prediction motion vector for each frame, wherein the value of the evaluation function is calculated only for a frame within a frame group which satisfies a condition that the numbers of bidirecitonally predicted regions in consecutive frames are small in the step (c), in addition to the above described steps (a) through (d).

In this case, the evaluation function that is calculated in the step (c) includes, for example, the number of bidirectionally predicted regions having both a forward prediction motion vector and a backward prediction motion vector for each frame within the frame group, as a parameter.

A moving image processing method according to a twelfth preferred mode of the present invention comprises the step of (f2) storing, as scene change information, the first information and the second information of a frame within a frame group which satisfies a condition that the numbers of bidirectionally predicted regions in consecutive frames are small, and the appearance interval of a frame which becomes a scene change.

A moving image processing method according to a thirteenth preferred mode of the present invention comprises the step of (g2) storing, as scene change information, the first and the second information of a frame within a frame group which satisfies a condition that the number of bidirectionally predicted regions in consecutive frames is small, an appearance interval of a frame becoming a scene change in addition to the above described steps (a) through (f2).

A moving image processing method according to a fourteenth preferred mode of the present invention comprises the steps of: (h2) calculating the value of an evaluation function by using the stored scene change information; and (i2) determining a scene change by making a comparison between the calculated value of the evaluation function and a threshold value, in addition to the above described steps (a) through (g2).

A moving image processing method according to a fifteenth preferred mode of the present invention comprises the step of: (j2) changing the threshold value so that the number of scene changes, which is determined in the step (i2), becomes a specified number, in addition to the above described steps (a) through (i2).

A moving image processing method according to a sixteenth preferred mode of the present invention comprises the step of (e3): restoring an image within a frame of the scene change determined by the scene change determining unit, in addition to the above described steps (a) through (d).

A storage medium according to a seventeenth preferred mode of the present invention is a computer-readable storage medium on which is recorded a program for causing a computer to execute a process, said process comprising: (a) collecting first information about a motion vector for each frame from moving image data that is compressed with inter-frame prediction encoding; (b) collecting second information about the correlation with a preceding/succeeding frame without decoding an image for each frame; (c) calculating the value of an evaluation function including the first and the second information as parameters; and (d) determining a scene change by making a comparison between the calculated value of the evaluation function and a threshold value.

With the above described program, for example, in the step (a), the first information about a motion vector for each frame is collected by the computer from first header information which is added in units of frames of the compressed moving image data, and second header information which is added in units of constituent elements of the frame without decoding the image of the frame.

With the above described program, for example, in the step (b), the second information about the correlation with a frame preceding/succeeding each frame is collected by the computer from the first header information which is added in units of frames of the compressed moving image data, and the second header information which is added in units of constituent elements of the frame without decoding the image of the frame.

The evaluation function is, for example, a function into which parameters are linearly combined with coefficients that are assigned to the respective parameters. Or, the evaluation function is, for example, a function the parameters of which are determined according to an appearance cycle of an intra-frame encoded frame or a forward predicted frame in the encoded moving image data. Additionally, the evaluation function possesses an offset constant. The first information is, for example, the number and the magnitudes of motion vectors, whereas the second information is, for example, the square measure of a region having a low correlation with a preceding/succeeding frame.

BRIEF DESCRIPTION OF DRAWINGS

FIG. 7 exemplifies an inserted and synthesized image from which a scene change can be detected;

FIG. 12 shows a scene change detection condition using the number of forward prediction motion vectors and the number of backward prediction motion vectors, when an "i" frame is a scene change point;

FIG. 13 shows a scene change detection condition using the number of forward prediction motion vectors and the number of backward prediction motion vectors, when an "i+1" frame is a scene change point;

FIG. 14 shows scene change detection conditions using the number of forward prediction motion vectors and the number of backward prediction motion vectors, when an "i+2" frame is a scene change point;

FIG. 15 shows scene change detection conditions using the number of forward prediction motion vectors, the number of backward prediction motion vectors, and the number of bidirectionally predicted regions, when an "i" frame is a scene change point;

FIG. 16 shows scene change detection conditions using the number of forward prediction motion vectors, the number of backward prediction motion vectors, and the number of bidirectionally predicted regions, when an "i+1" frame is a scene change point;

FIG. 17 shows scene change detection conditions using the number of forward prediction motion vectors, the number of backward prediction motion vectors, and the number of bidirectionally predicted regions, when an "i+2" frame is a scene change point;

DESCRIPTION OF THE PREFERRED EMBODIMENTS

A moving image processing device according to the present invention is applicable to a variety of fields, and available, for example, as a moving image reproducing device or a moving image editing device.

Figure 1:
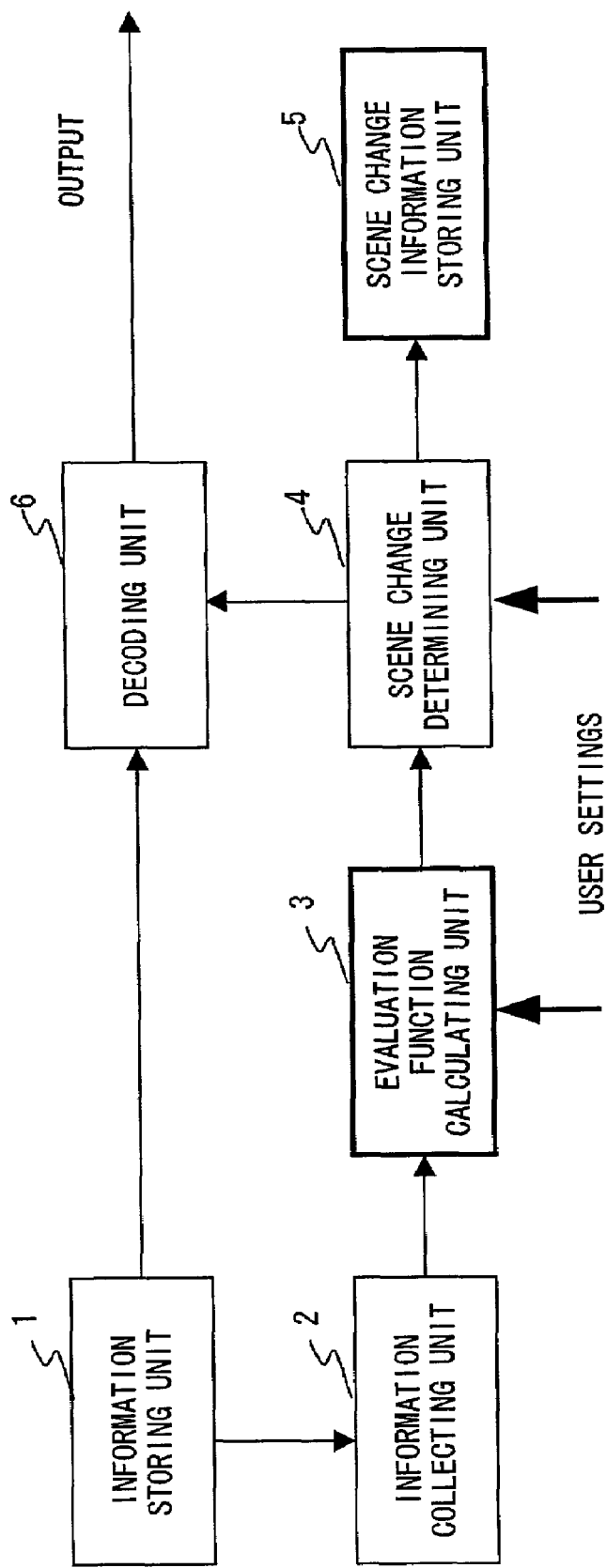
FIG. 1 is a block diagram showing the principle of a moving image reproducing device according to the present invention.

FIG. 1 is a block diagram explaining the principle of a moving image reproducing device (moving image processing device) according to the present invention.

In this figure, an information storing unit 1 is a storage device storing data of a moving image encoded with block adaptive inter-frame prediction encoding. An information collecting unit 2 collects information such as the information of a motion vector, the square measure of a region having a low correlation with a preceding/succeeding frame, etc. from the data of the encoded moving image stored in the information storing unit 1. Namely, the information collecting unit 2 decodes part of the data of the encoded moving image, and extracts the information about the number and the magnitudes of motion vectors for each frame, the square measure of a region having a low correlation with a preceding/succeeding frame, etc.

An evaluation function calculating unit 3 calculates the value of a predetermined evaluation function including the information collected by the information collecting unit 2 as parameters. That is, the evaluation function calculating unit 3 calculates the value of the evaluation function from the information about the number and the magnitudes of motion vectors, which are collected by the information collecting unit 2, the square measure of a region having a low correlation with a preceding/succeeding frame, etc. Coefficients of respective parameters of the evaluation function can be set by a user. Suitable coefficients are set, for example, according to the contents (genre) of a moving image. Additionally, the coefficients are changed according to the number of scene changes detected by a scene change determining unit 4.

The scene change determining unit 4 determines a scene change of the moving image based on the value of the evaluation function, which is calculated by the evaluation function calculating unit 3. Namely, the scene change determining unit 4 determines a scene change by making a comparison between the value of the evaluation function and a predetermined threshold value. The threshold value is changed, for example, according to the number of scene changes, which is input to the scene change determining unit 4 by a user.

A scene change information storing unit 5 stores the information (scene change information) about the scene change determined by the scene change determining unit 4. The scene change information is, for example, the number and the magnitudes of motion vectors within a preceding/succeeding frame of a scene change, the square measure of a region having a low correlation with the preceding/succeeding frame, a scene change interval, etc. A frame of a scene change can be identified from a scene change interval. However, scene change information and the frame number of a scene change may be corresponded and stored to speed up the processing.

A decoding unit 6 reads encoded moving image data from the information storing unit 1, decodes the read moving image, and outputs the decoded moving image. The decoding unit 6 restores and outputs only an image of a frame of a scene change based on the information input from the scene change determining unit 4.

Figure 2:
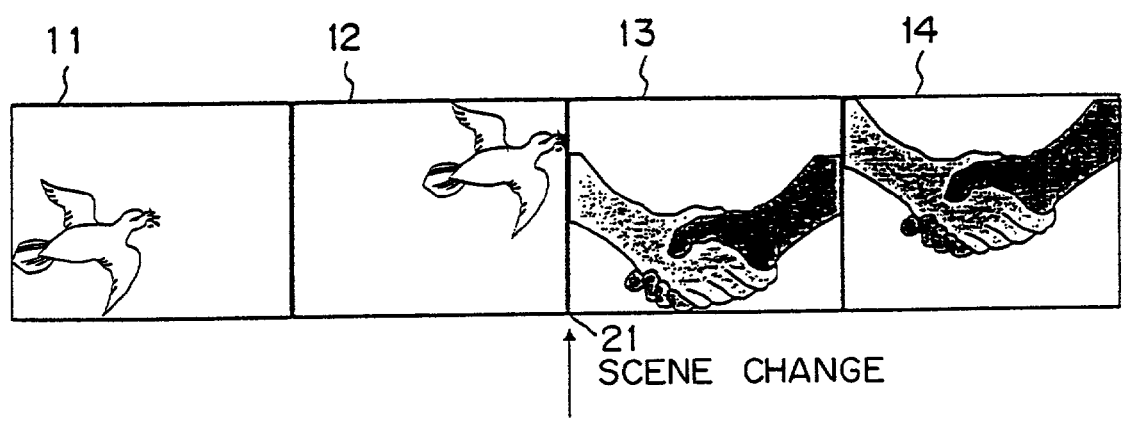
FIG. 2 explains a scene change.

FIG. 2 explains a scene change.

This figure shows four consecutive frames 11 through 14. As shown in this figure, the scene of the frames 11 and 12 is definitely different from that of the frames 13 and 14, and a scene change occurs when the display of the frame 12 is switched to that of the frame 13. The scene change indicates the seam 21 between the frames 12 and 13. Additionally, a frame which becomes a scene change is the frame 13 in this case.

Figure 3A:
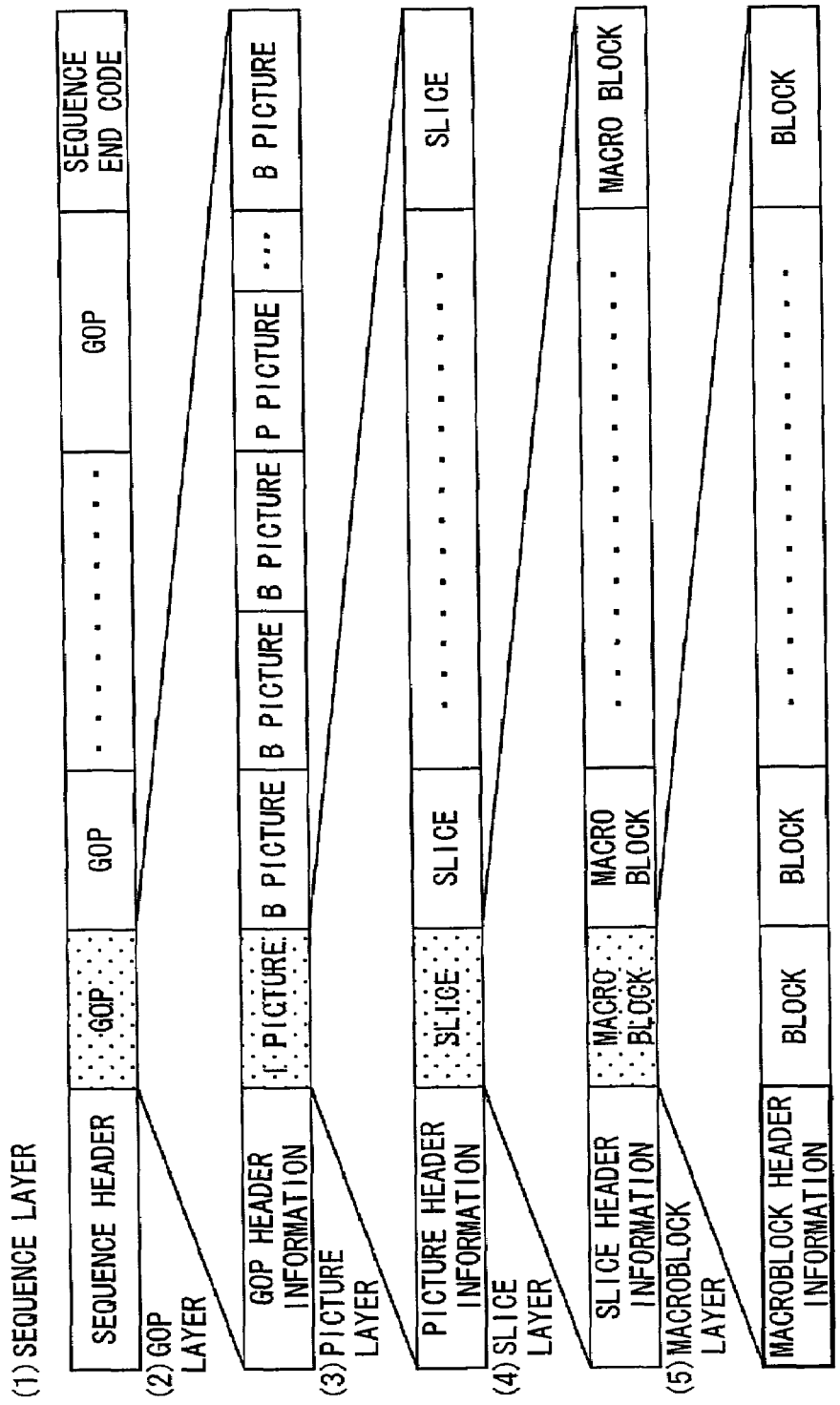
FIG. 3A shows the layered structure of data of a moving image encoded with the MPEG.
Figure 3B:
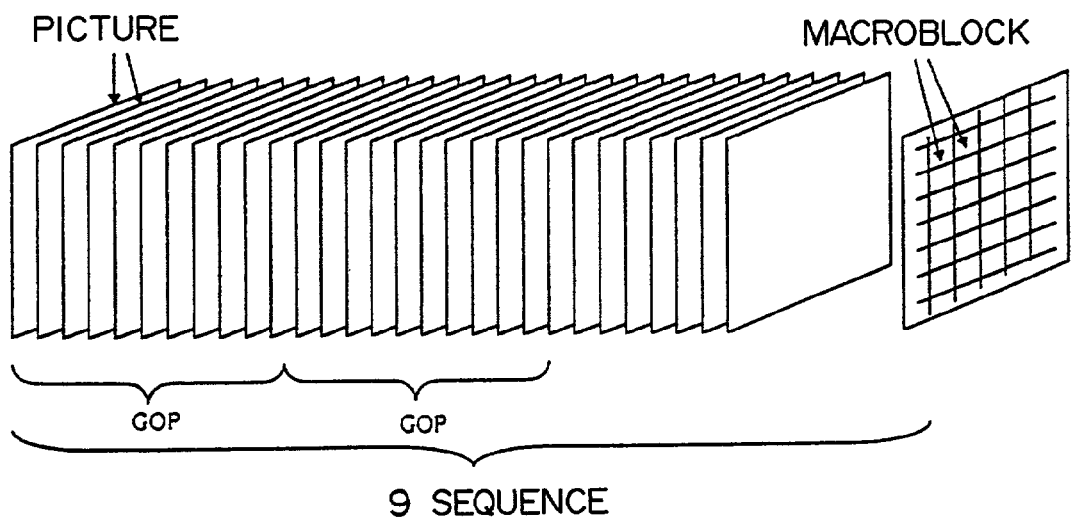
FIG. 3B shows the configuration of a sequence.

The information storing unit 1 stores, for example, the data of a compressed moving image in a format shown in FIG. 3. FIG. 3A shows the layered structure of the data of a moving image encoded with an inter-frame prediction encoding method such as ISO/IEC MPEG1, ISO/IEC MPEG2, etc. As shown in FIG. 3B, encoded data of a sequence 9 composed of a plurality of consecutive pictures has a 6-layered structure including a sequence layer, a GOP (Group Of Pictures) layer, a picture layer, a slice layer, and a macroblock layer, which are shown in FIG. 3A, and a block layer (not shown).

Data of the sequence layer is data of a screen group having a series of identical attributes (such as an image size, an image rate, etc.), and has a sequence header and a sequence end code respectively at the beginning and the end. The sequence header is intended to specify a screen format, etc., and a start code is set at its beginning. The sequence end code is a code indicating the end of the sequence. Data of one or a plurality of GOP layers exist between the sequence header and the sequence end code (see (1) of FIG. 3A).

Data of a GOP layer is a minimum unit of a screen group which becomes a random access unit. GOP header information exists at the beginning, and one or a plurality of pieces of data of three picture layer types such as I, B, and P pictures succeed the GOP header information (see (2) of FIG. 3A).

For the data of the picture layer, picture header information exists at its beginning, and data of a plurality of slice layers succeed the picture header information (see (3) of FIG. 3A). In the picture header information, the scale of an entire frame is recorded.

Data of a slice layer is a minimum unit within a data string having a start code. Slice header information exists at its beginning, and data of an arbitrary number of macroblocks succeed the slice header information (see (4) of FIG. 3A).

For data of the macroblock layer, macroblock header information exists at its beginning, and data of 6 block layers (4 luminance signal blocks and 2 color-difference signal blocks) succeed the macroblock header information (see (5) of FIG. 3A). The magnitude of an individual vector is recorded in the macroblock header information.

A motion vector obtained when a moving image is encoded is calculated from the scale obtained for each frame (data within the picture header information) and the magnitude of an individual vector (data within the macroblock header information) with a predetermined arithmetic operation.

As described above, the single sequence 9 of a moving image is partitioned into GOPs each composed of one or a plurality of pictures (frames), and variable-length-encoded (see FIG. 3B). A GOP is composed of an intra-frame encoded image (I picture), an inter-frame encoded image (P picture), which is predicted from a frame that is prior in terms of time and has already been encoded, and an inter-frame encoded image (B picture) predicted from two frames which are prior and subsequent in terms of time.

With the MPEG, the number of pictures (frames) within a GOP, an interval of I and P pictures, etc. can be set with an encoder.

A picture is configured by a slice, which is composed of a plurality of macroblocks. In the MPEG, the minimum encoding unit is a block composed by 8×8 pixels, and this block is a unit of a discrete cosine transform (DCT). A total of 6 blocks including 4 adjacent Y signal blocks, and one Cb block and one Cr block, which positionally correspond to the Y signal blocks, is called a macroblock.

The macroblock is the minimum unit for motion compensation prediction. A motion vector for the motion compensation prediction is detected in units of macroblocks. A macroblock (MB) falls into 4 types such as an intra MB obtained by performing the discrete cosine transform (hereinafter abbreviated to DCT) for an original signal, a forward MB predicted only from forward, a backward MB predicted only from backward, and a bi-predictive MB predicted from both forward and backward. An I picture is encoded only with intra MBs. However, an intra MB or a forward MB is selected for each macroblock for a P picture.

Figure 4:
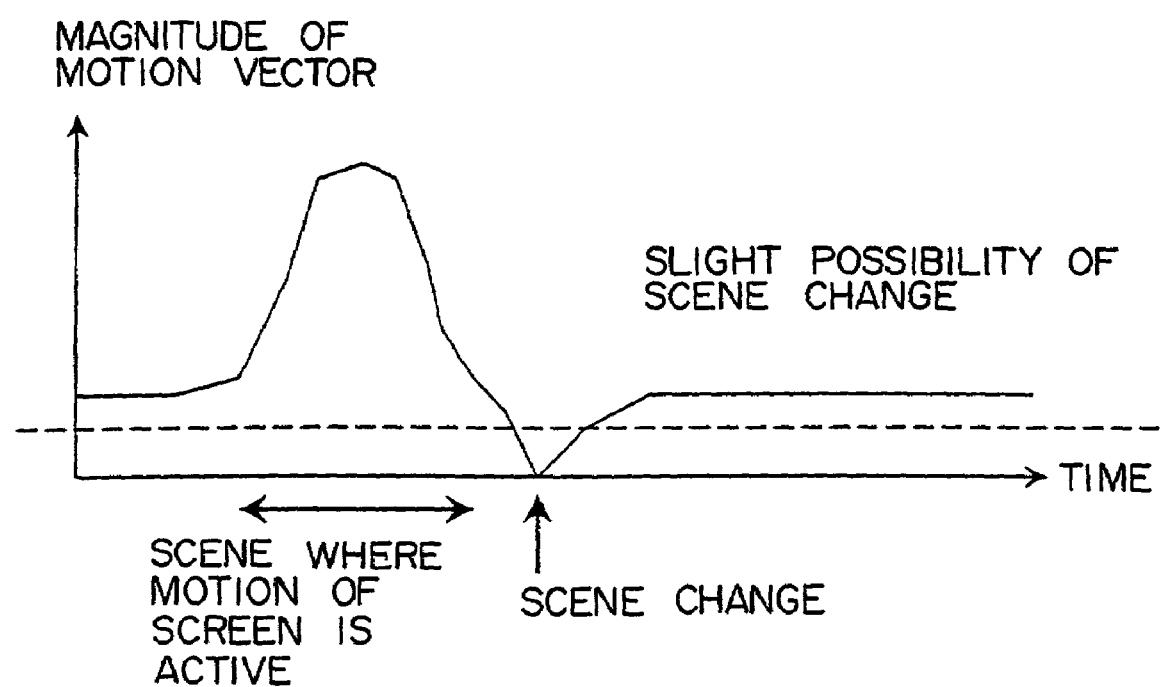
FIG. 4 shows the relationship between the magnitude of a motion vector and a scene change.

FIG. 4 shows the transition of the magnitude of a motion vector in a moving image, which changes with time. As shown in this figure, the magnitude of the motion vector significantly decreases at a scene change, although it increases in a portion where the motion of a camera or a subject, such as pan or tilt, is active. Accordingly, the sum total of motion vectors is detected for each frame, an evaluation function for the sum total is generated for each frame, and a comparison between the value of the evaluation function and a predetermined threshold value is made, so that a scene change can be detected. For example, if the magnitude of the motion vector is larger than the threshold value indicated by a broken line of FIG. 4, it is determined that there is a slight possibility of a scene change.

However, if the presence/absence of a scene change is evaluated by observing only a motion vector, the magnitude of a motion vector does not contribute to the value of an evaluation function if the magnitude is small, leading to a degradation of the accuracy of scene change detection. In the example shown in FIG. 4, the magnitude of the motion vector is close to the threshold value (the value indicated by the broken line) even in a portion where no scene change occurs.

Figure 5:
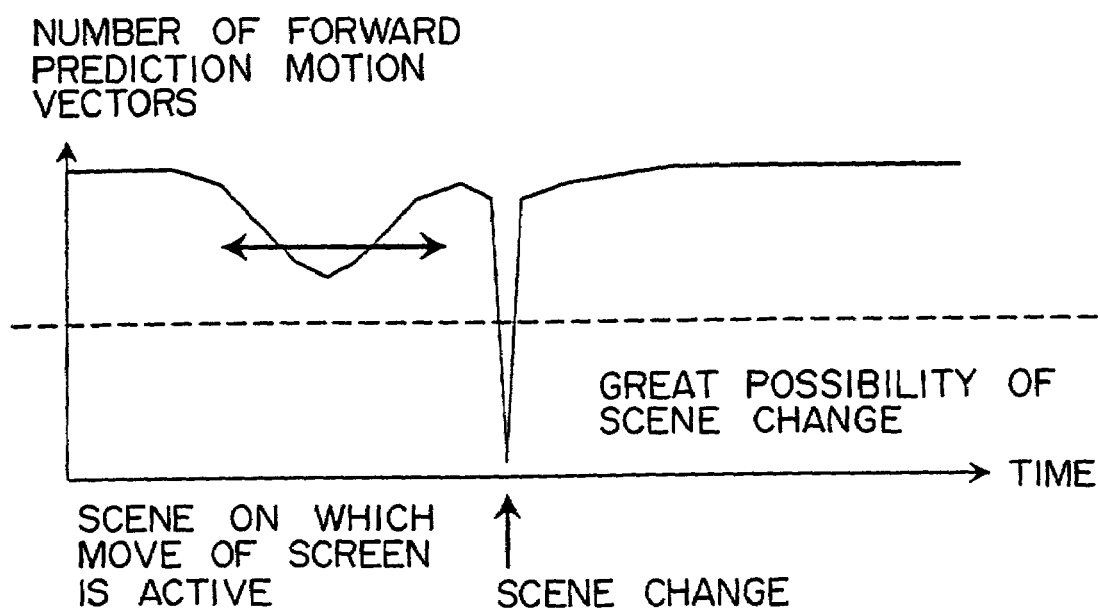
FIG. 5 shows the relationship between the number of forward prediction motion vectors and a scene change.

Accordingly, by adding detection information of a motion vector, the reliability of an evaluation function for detecting a scene change can be improved. The detection information of a motion vector is reflected on the number of motion vectors. FIG. 5 shows the result of examining the number of forward prediction motion vectors, which changes with time, for each frame. As shown in this figure, the number of forward prediction motion vectors significantly decreases at a scene change. Accordingly, a scene change can be also detected by defining the number of motion vectors for each frame to be an evaluation function, and by making a comparison between the value of the evaluation function and a threshold value (the portion where the number of motion vectors becomes smaller than the value indicated by the broken line of FIG. 5 is regarded as a scene change with a great possibility).

As described above, a motion vector is assigned to each macroblock. Information indicating whether or not a macroblock has a motion vector is stored in the macroblock information in the macroblock layer in (5) of FIG. 3A. Accordingly, the number and the magnitudes of motion vectors can be obtained at the same time. This means that both the accuracy of an evaluation function and the efficiency of the processing time taken to collect information that is required for the evaluation function can be improved.

Figure 6:
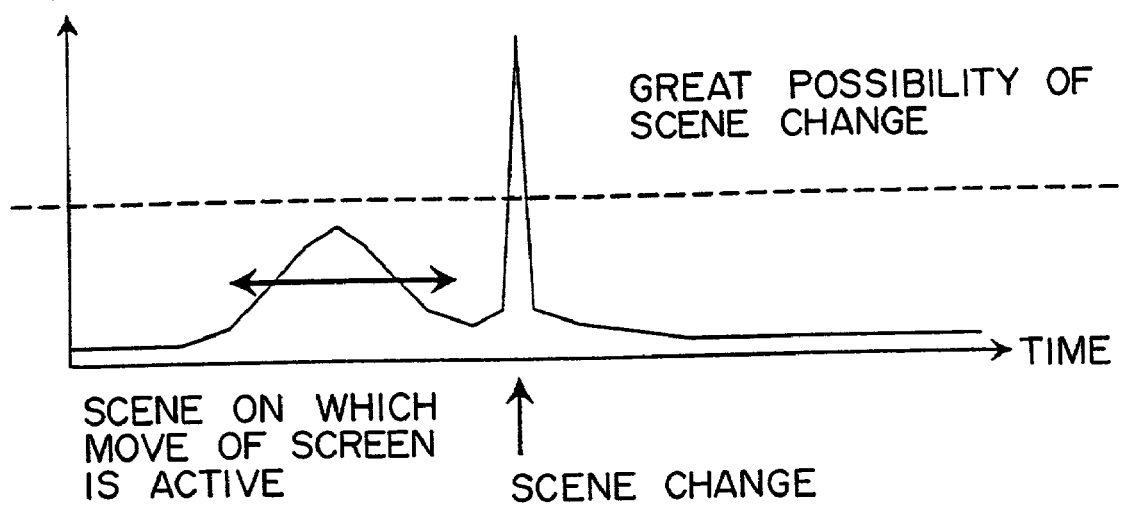
FIG. 6 shows the relationship between the square measure of a region having no correlation with a preceding/succeeding frame and a scene change.

Additionally, as shown in FIG. 6, evaluation of also a square measure having no correlation with a preceding/succeeding frame has a significant meaning for evaluating the presence/absence of a scene change, as shown in FIG. 6. As shown in this figure, a square measure having no correlation with a preceding/succeeding frame significantly increases at a scene change. A square measure having no correlation with a preceding/succeeding frame increases even on a scene where the move of a screen is active. By suitably setting a threshold value for the value of an evaluation function that evaluates a square measure having no correlation with the preceding/succeeding frame, a portion of a scene change with a great possibility can be suitably evaluated.

With a conventional method, a scene change is detected by decoding an encoded image, by taking a difference between frames, and by using a discrete cosine transform coefficient (DCT coefficient). This method, however, requires a large arithmetic operation amount, and recalculates motion vectors in order to make a correspondence between an individual value and a region to be compared, leading to an increase in the processing time.

According to the present invention, a macroblock that is determined not to have a motion vector at the time of encoding is regarded as a region having no correlation with a preceding/succeeding frame. Then, a square measure having no correlation with a preceding/succeeding frame is defined to be a sum total of the product of the number of macroblocks having no motion vector and the square measure of a macroblock. Since the square measure of a macroblock is equal in the same moving image in this case, evaluation of a square measure having no correlation with a preceding/succeeding frame is equivalent to the evaluation of the sum total of the number of macroblocks having no motion vector within a frame. As described above, the square measure of a region having no correlation with a preceding/succeeding frame can be obtained simultaneously with the magnitude of a motion vector. Accordingly, evaluation of the square measure of a region having no correlation with a preceding/succeeding frame means the contribution to an improvement in the accuracy of an evaluation function, and an increase in the efficiency of the processing time taken to collect information required for calculating the value of the evaluation function.

Operations of the evaluation function calculating unit 3 are explained next.

First of all, generation of an evaluation function is exemplified. As shown in FIGS. 4 through 6, both the number of motion vectors and the magnitude of a motion vector significantly decrease at a scene change. In contrast, the square measure of a region having no correlation with a preceding/succeeding frame increases. Accordingly, negative coefficients are given to the magnitude of a motion vector and the number of motion vectors, whereas a positive coefficient is given to the square measure of a region having no correlation with a preceding/succeeding frame. In the meantime, within a GOP, a bidirecitonally prediction encoded frame appears as a pair to either of an intra-frame encoded frame (I picture) or a forward prediction encoded frame (P picture). At this time, the intra-frame encoded frame or the forward prediction encoded frame appears in a cycle of M frames. Therefore, the M frames are gathered to generate an evaluation function. An evaluation function E(i) in case of M=3 is exemplified below.

$$Ei = C0V(i) + C1V(i+1) + C2V(i+2) + C3NI(i) + C4NI(i+1) + C5NI(i+2) + C6NF(i) + C7NF(i+1) + C8NF(i+2) + C9NB(i) + C10NB(i+1) + C11NB(i+2) + C12ND(i) + C13ND(i+1) + C14ND(i+2) + C15F + C16$$

v: The sum total of motion vectors within a frame.

NI: The total square measure of regions having no correlation with a preceding/succeeding frame within a frame.

NF: The total number of forward prediction motion vectors within a frame.

NB: The total number of backward prediction motion vectors within a frame.

ND: The total number of motion vectors having both a forward prediction motion vector and a backward prediction motion vector.

F: A frame interval of a scene change (scene change interval). In case of an initial scene change frame, the number of frames counted from the first frame.

C0 to C16: Coefficients.

The scene change determining unit 4 determines a scene change by making a comparison between the value of the evaluation function E(i) calculated by the evaluation function calculating unit 3 and a predetermined threshold value.

For the coefficients C0 through C16, several patterns can be preset. The coefficients C0 through C16 may be set by trial and error. However, since the evaluation function E(i) is a linear function, the coefficients can be easily obtained with a multivariate analysis method such as discriminant analysis, etc., an optimization method such as a steepest descent method, etc., a method simulating the activity or judgment of the brain such as a neural network, fuzzy inference, etc.

With the evaluation function E(i), a scene change can be prevented from being undetected by adjusting the coefficient C16 even for an image inserted and synthesized into the same background shown in FIG. 7.

Note that the evaluation function E(i) is merely one example. Some of the above described parameters may be used, and a variety of forms of parameter combinations can be considered. Additionally, the evaluation function E(i) may be a different polynomial, etc. Furthermore, the number of parameters of the evaluation function E(i) must be suitably changed according to the value of M.

As respectively shown in FIGS. 7A and 7B, if an image is reduced and inserted in the vicinity of the center or in the lower right portion of the screen, also regions (macroblocks) having valid information become small. Therefore, the value of the evaluation function EI (i) is estimated to be small. For this reason, scene change undetection can possibly occur if the image inserted and synthesized as shown in FIGS. 7A and 7B are evaluated with the same threshold value as that of a normal image which is not reduced, based on the assumption that the larger the value of the evaluation function E(i), the stronger the possibility of a scene change. Accordingly, for the images inserted and synthesized as shown in FIGS. 7A and 7B, the value of the evaluation function E(i) can be evaluated with the same threshold value by increasing the value of the coefficient C16. A similar evaluation can be made also by multiplying the coefficients C0 to C16 by a constant.

The evaluation function calculating unit 3 can preset the coefficients C0 through C16 of the evaluation function E(i) to values according to the contents (genre) of a moving image. In this case, the values of the coefficients C0 through C16 are changed, for example, by a user input. By changing the values of the coefficients C0 through C16 according to the contents (genre) of a moving image as described above, the case where the degrees of importance are different although the value of the evaluation function E(i) is the same can be coped with.

For example, in sports programs, the motion of a subject such as a player, a ball, etc., and the motion of a camera such as pan, tilt, etc. are more active than those in other programs, there is a tendency such that a change or the magnitude of a motion vector is large. Accordingly, the magnitude of a motion vector increases, whereas the value of the evaluation function E(i) decreases. Furthermore, in a drama or a news program, there is a tendency such that the motions of a subject and a camera when an actor or a newscaster delivers his or her lines or comment are less active than those in other programs. Therefore, the magnitude of a motion vector decreases, whereas the value of the evaluation function E(i) increases. Since the value of the evaluation function E(i) varies according to the contents of a moving image as described above, the values of the coefficients C0 through C16 are changed according to the contents (genre) of a moving image, thereby coping with a change in the value of the evaluation function E(i).

Furthermore, the evaluation function calculating unit 3 can change the values of the coefficients C0 through C16 of the evaluation function E(i) according to the contents of a moving image or a user specification. For example, scene cutting is made very frequently in a music program or a drama, and very short scenes may continue in some cases. Although such frequent cutting may sometimes be regarded as a meaningful scene, the number of meaningless scenes increases on the other hand. Accordingly, the significance of a scene change may differ depending on the contents of a moving image. According to the present invention, the values of the coefficients C0 through C16 of the evaluation function E(i) are changed according to the contents of a moving image or a user specification, thereby coping with the case where the degree of importance of a scene change differs depending on the contents of a moving image.

The evaluation function calculating unit 3 first selects a scene change by using the number of motion vectors so as to speed up the processing.

Figure 8:
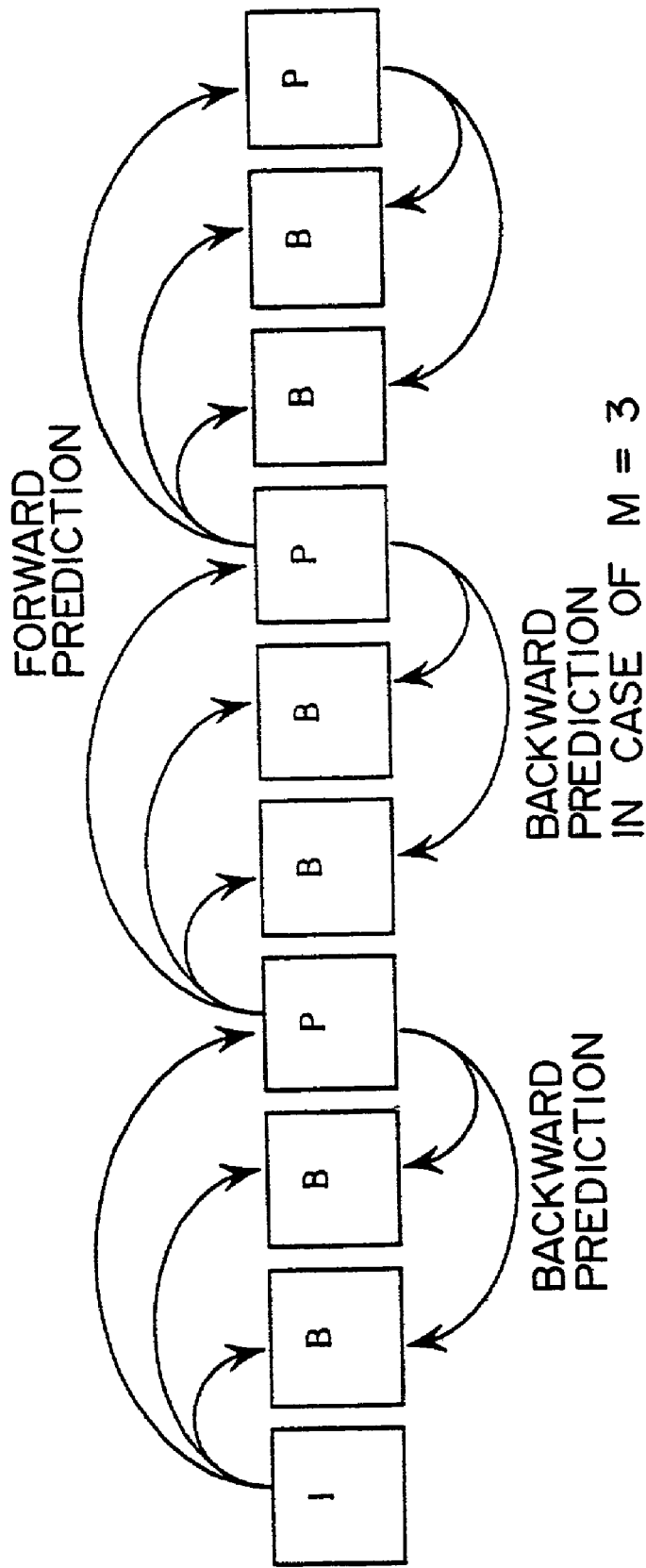
FIG. 8 explains forward prediction and backward prediction in inter-frame prediction encoding.

FIG. 8 shows an inter-frame prediction encoding method according to the MPEG. This figure shows the case where the cycle M of I and P pictures is 3.

As shown in this figure, with the inter-frame prediction encoding, forward prediction and bidirectional prediction are respectively performed when P and B pictures are encoded. As described above, preceding and succeeding frames are referenced at the time of the inter-frame prediction encoding. However, preceding and succeeding frames are not referenced in part (motion compensation prediction is not performed in part) for frames before and after a scene change. Such a reference relationship exhibits as the number of motion vectors.

Such a relationship between a scene change and the number of motion vectors is explained with reference to FIGS. 9 through 11 by taking the case of M=3 as an example.

Figure 9:
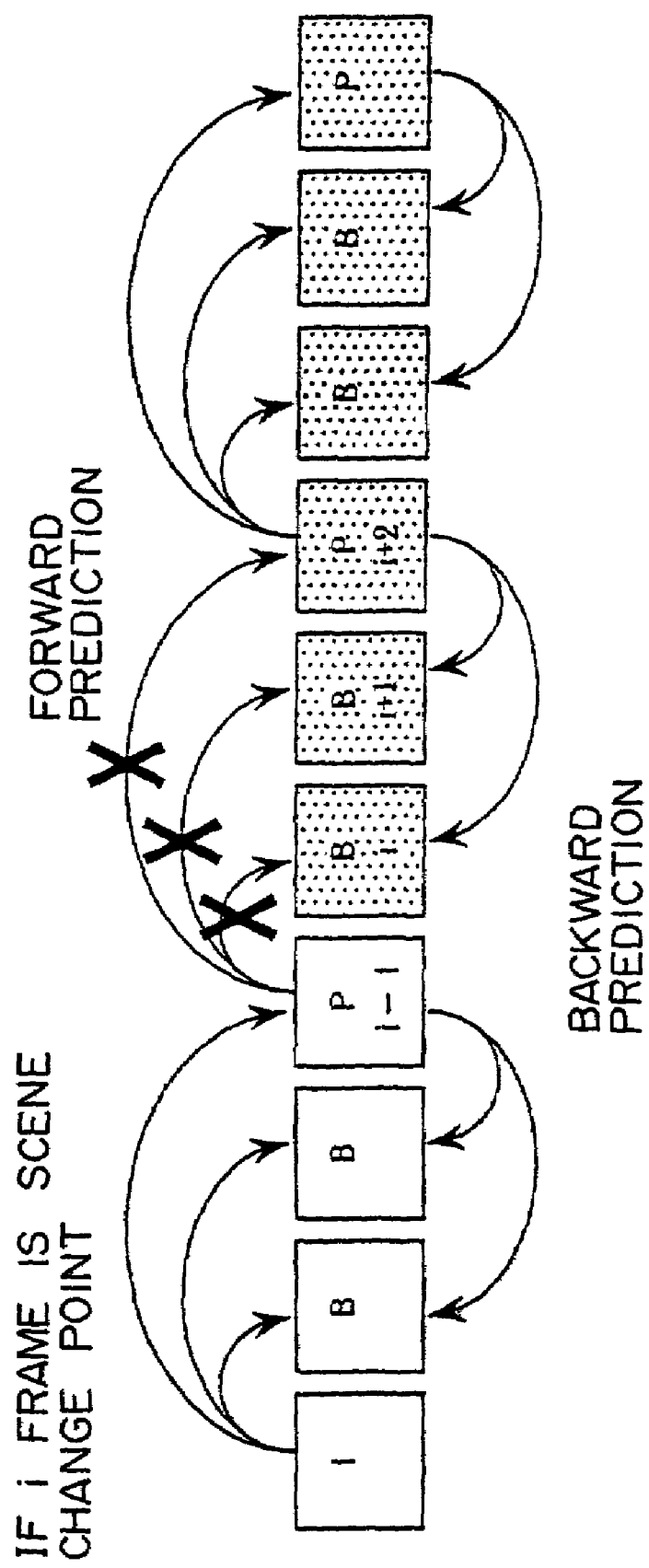
FIG. 9 explains the number of forward prediction motion vectors in "i", "i+1", and "i+2" frames, when the "i" frame is a scene change point.

FIG. 9 shows the case where a scene changes from an "i" frame (a bidirectionally prediction encoded frame (B picture) in this case). In this case, the numbers of motion vectors in the forward prediction for an "i−1" frame (a forward prediction encoded frame (P picture) immediately before the scene change) decrease in an "i" frame (B picture), an "i+1" frame (B picture), and an "i+2" frame (P picture).

Figure 10:
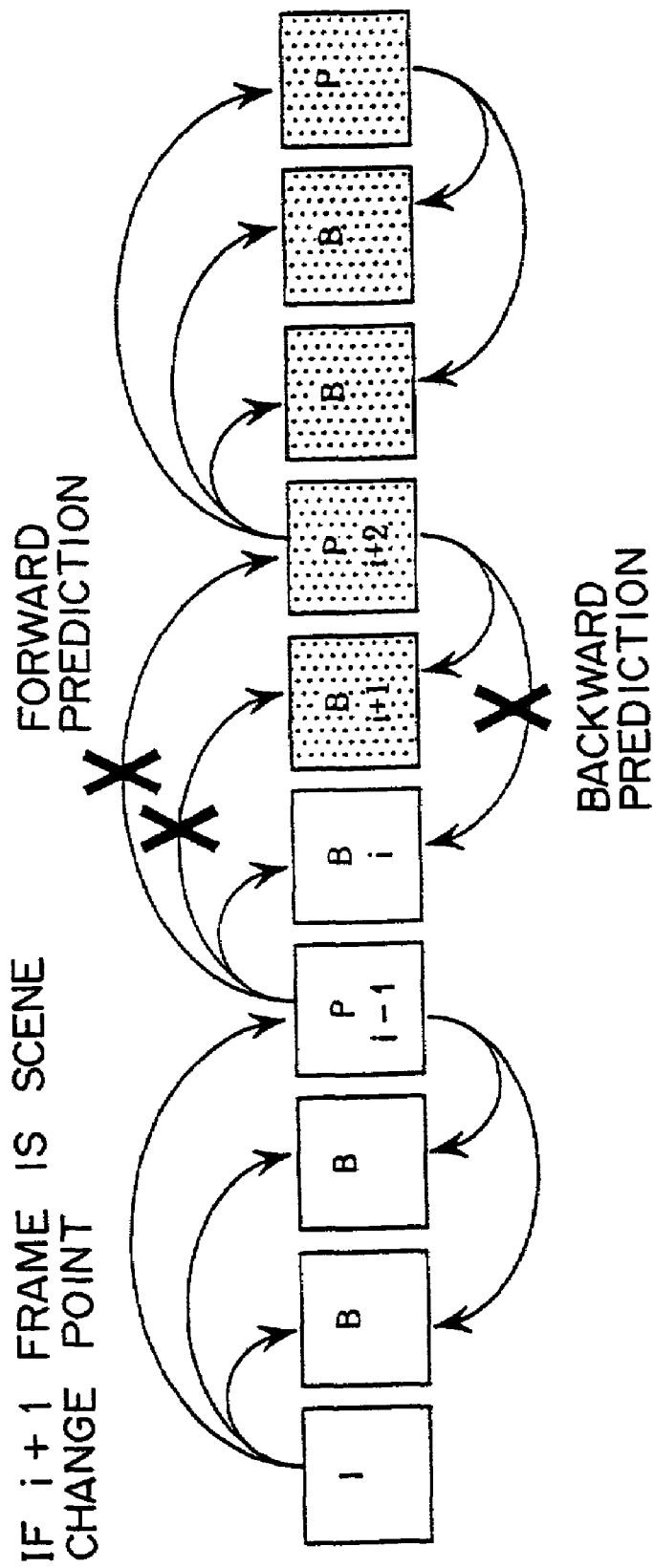
FIG. 10 explains the number of forward prediction motion vectors in "i+1" and "i+2" frames, and the number of backward prediction motion vectors in an "i" frame, when the "i+1" frame is a scene change point.

FIG. 10 shows the case where a scene changes from an "i+1" frame (in this case, a bi-directionally prediction encoded frame (B picture)). In this case, the numbers of motion vectors in the forward prediction for an "i−1" frame (the forward prediction encoded frame (P picture) immediately before the scene change) decrease in an "i+1" frame (B picture) and an "i+2" frame (P picture), and the number of motion vectors in the backward prediction for the "i+2" frame (the forward prediction encoded frame (P picture) immediately after the scene change) decreases in the "i" frame (B picture)).

Figure 11:
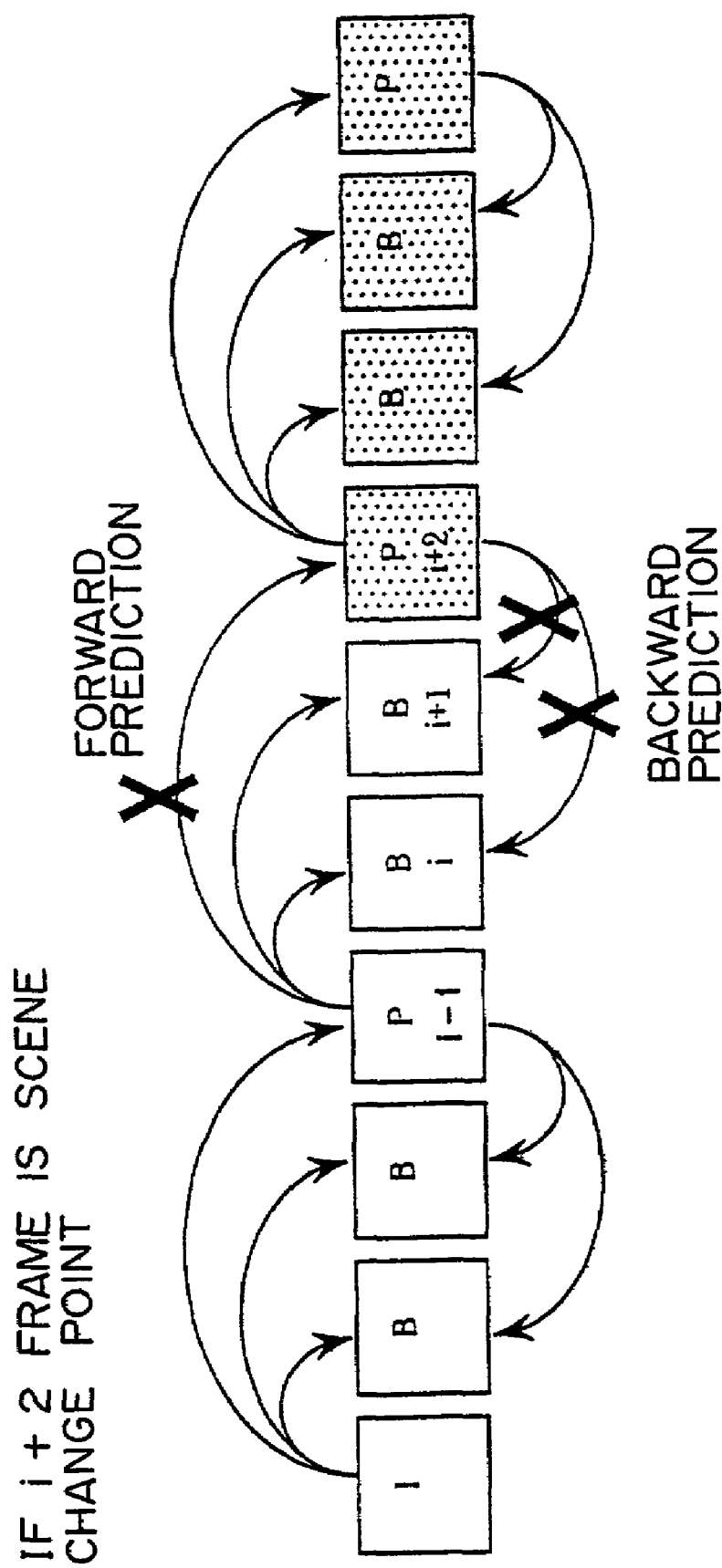
FIG. 11 explains the number of forward prediction motion vectors within an "i+2" frame, and the number of backward prediction motion vectors within "i" and "i+1" frames, when the "i+1" frame is a scene change point.

FIG. 11 shows the case where a scene changes from an "i+2" frame (P picture). In this case, the numbers of motion vectors in the forward prediction for an "i−1" frame (the forward prediction encoded frame (P picture) immediately before the scene change) decrease in an "i+2" frame (P picture), and the number of motion vectors in the backward prediction for the "i+2" frame (the forward prediction encoded frame (P picture) immediately after the scene change) decreases in an "i" frame (B picture) and "i+1" frame (B picture).

FIGS. 12 through 14 show the arrangements of the conditions in the cases where a scene change occurs, which are shown in FIGS. 9 through 11. The cases shown in FIGS. 9, 10, and 11 respectively correspond to FIGS. 12, 13, and 14.

When a scene change occurs, conditions of the numbers of motion vectors, which are shown in FIGS. 12 through 14, are satisfied. However, since the conditions shown in FIGS. 12 through 14 are sometimes satisfied even when a scene change does not occur, the accuracy of scene change detection becomes low if only the numbers of motion vectors are used. Therefore, according to the present invention, the conditions shown in FIGS. 12 through 14 are used to roughly detect a scene change by using the natures of a scene change, which focus on motion vectors and are shown in FIGS. 12 through 14, as prerequisites. Namely, a scene change cannot be accurately detected under the conditions shown in FIGS. 12 through 14. Therefore, these conditions are used to screen scene change target frames to some extent. Since the number of parameters of the evaluation function E(i) is large, an arithmetic operation amount becomes relatively large. Therefore, the number of times of arithmetic operations for the evaluation function E(i) is reduced by screening target frames for which the evaluation function E(i) is calculated with the use of the conditions shown in FIGS. 12 through 14, so that the processing time is shortened.

In the inter-frame prediction encoding, a region having both a forward prediction motion vector and a backward prediction motion vector (a region having bidirectionlly predicted motion vectors) exists. This is assumed to be called a bidirectionally predicted region for the sake of convenience.

FIGS. 15, 16, and 17 respectively show condition tables, which are shown in FIGS. 12, 13, and 14, and the information about the bidirectionally predicted region and the information about an "i+2" frame are added to.

The three types of cases shown in FIGS. 12 through 14 have a commonality such that the number of bidirectionally predicted regions is minimal in the "i" and the "i+1" frames as shown in FIGS. 15 through 17. Accordingly, by making a comparison between the number of bidirectionally predicted regions and a predetermined threshold value, the number of times of the comparison operation between the number of forward prediction motion vectors and that of backward prediction motion vectors can be decreased. According to the present invention, the conditions shown in FIGS. 15 through 17 are used as prerequisites of a scene change, and the amount of the comparison operation for screening frames to be calculated for the evaluation function E(i), so that the processing time is shortened.

That is, according to the present invention, scene change selection is made in the following two stages in order to shorten the processing time.

1) Selecting consecutive frames whose numbers of bidirectionally predicted regions are equal to or smaller than a threshold value.
2) Making a comparison between the number of forward prediction motion vectors or that of backward prediction motion vectors and a threshold value for the frame selected in 1).
3) Selecting a frame whose result of the comparison with the threshold value in 2) satisfies any of the conditions shown in FIGS. 15 through 17.

The scene change determining unit 4 can change the threshold value compared with the value of the evaluation function E(i) so as to detect a scene change. For example, the number of scene changes normally increases in long-duration moving image data. Also, the number of scene change increases if cutting is made frequently in a program although a recording time is short. When a moving image is encoded, all scene changes must be used. However, in a moving image reproducing device, it is not always necessary to present all scene changes. Therefore, according to the present invention, the number of presented scene changes can be altered by varying the threshold value for determining a scene change. At this time, the larger the value of the evaluation function E(i), the stronger the possibility that a frame is a scene change. Therefore, a scene change with a high degree of importance can be presented.

Figure 18:
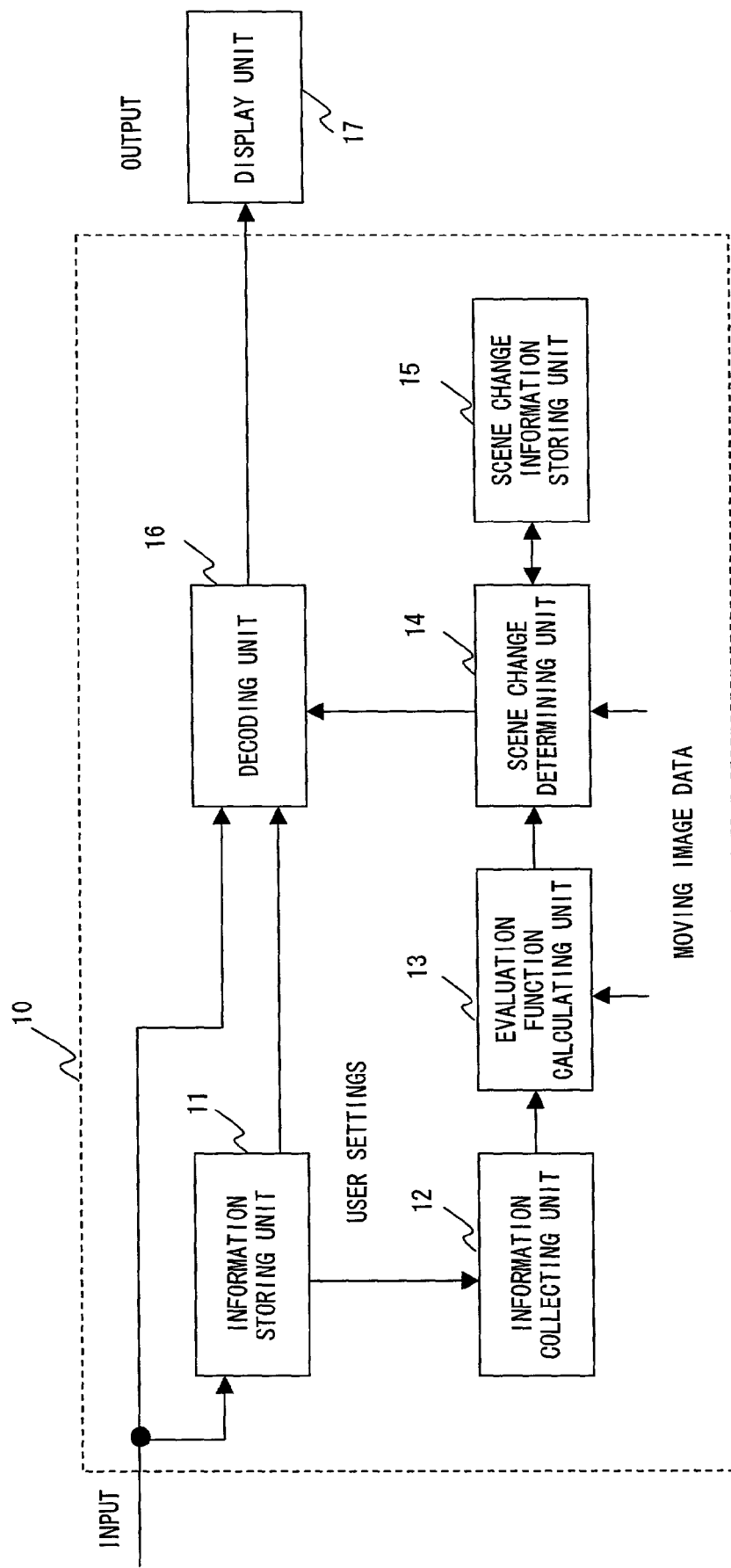
FIG. 18 is a block diagram showing the system configuration of a moving image reproducing device according to a first preferred embodiment of the present invention.

FIG. 18 is a block diagram showing the system configuration of a moving image reproducing device according to a first preferred embodiment of the present invention. In this figure, an information storing unit 11, an information collecting unit 12, an evaluation function calculating unit 13, a scene change determining unit 14, and a scene change information storing unit 15 have capabilities similar to those of the above described information storing unit 1, the information collecting unit 2, the evaluation function calculating unit 3, the scene change determining unit 4, and the scene change information storing unit 5, which are shown in FIG. 1.

A decoding unit 16 has a capability similar to that of the decoding unit 6 shown in FIG. 1, and also decodes encoded data, which is externally input, except for encoded moving image data stored in the information storing unit 11. The decoding unit 16 outputs decoded moving image data or an image of a scene change to a displaying unit 17.

The moving image reproducing device 10 according to the first preferred embodiment, which is enclosed by a broken line in FIG. 18, has the capabilities for decoding and displaying encoded moving image data, for detecting a scene change from decoded moving image data, and for storing a detected scene change and information used to detect the scene change.

The information storing unit 11 is a device recording/storing encoded moving image data. When a moving image is reproduced and a scene change is detected, the moving image data is read from this unit into the information collecting unit 12 and the decoding unit 16. As the information storing unit 11, a device that can quickly read encoded moving image data is suitable for presenting a scene change at high speed. Or, a device that can record a large amount of moving image data is suitable. For example, an optical disk device, a magneto-optical device, or a magnetic disk device, etc., whose access or seek speed is fast and whose capacity is large is suitable. The information collecting unit 12 is a device reading encoded moving image data from the information storing unit 11, and collecting information used to detect a scene change from the read data. The information storing unit 12 extracts the number of motion vectors, the magnitudes of the motion vectors, and the square measure of a region having a low correlation with a preceding/succeeding frame for each frame of the moving image data so as to detect a scene change at high speed and with high accuracy. At the same time, the information collecting unit 12 extracts an interval of a frame which satisfies the conditions shown in FIGS. 15 through 17. The information collecting unit 12 then extracts the frame which satisfies the conditions shown in FIGS. 15 through 17, and outputs only the frame to the evaluation function calculating unit 13, thereby shortening the arithmetic operation time of the evaluation function calculating unit 13. Additionally, the information collecting unit 12 removes unnecessary information (information unnecessary for detecting a scene change), thereby improving the accuracy of scene change detection.

Operations of the information collecting unit 12 are explained with reference to the flowchart shown in FIG. 19. This figure is the flowchart showing the operations performed when the frame cycle M of I and P pictures is 3.

The information collecting unit 12 reads 3 consecutive pictures (frames). Then, the information collecting unit 12 first searches for a picture header, and decodes a picture type (an I, a B, or a P picture) Additionally, the information collecting unit 12 decodes the scale of a motion vector (step S11).

Next, the information collecting unit 12 searches for a macroblock header (step S12), and extracts the first scene change information (the number of motion vectors, the amount of a motion vector, a square measure having a low correlation with a preceding/succeeding frame, and the number of bidirectionally predicted regions) for each picture (step S13).

The number of motion vectors is counted respectively for directions in terms of time such as forward, backward, and bidirectional by taking advantage of the information indicating the presence/absence of a motion vector, which is written to a macroblock header. Similarly, by taking advantage of the information indicating the presence/absence of a motion vector, which is written to the macroblock header, also a square measure having a low correlation with a preceding/succeeding frame is counted. Additionally, the magnitude of a motion vector is decoded from the macroblock header. Then, predetermined arithmetic operations are performed for the decoded value of the motion vector and the scale of the motion vector, which is decoded in step S11, so that the magnitude of the motion vector in pixels is obtained.

Next, to detect a frame (picture) which satisfies the conditions shown in FIGS. 15 through 17, the number of motion vectors is compared. At this time, the number of bidirecitonally predicted regions having both a forward prediction motion vector and a backward prediction motion vector is first compared with the first threshold value, and the first and the next frames whose numbers of bidirectionally predicted regions are minimal are selected. Then, the number of forward prediction motion vectors and that of backward prediction motion vectors are respectively compared with the second and the third threshold values for each of the selected 3 frames, and it is determined whether or not the comparison results satisfy any of the scene change conditions shown in FIGS. 13 through 15 (step S14).

If any of the scene change conditions is satisfied ("YES" in step S14), the frame interval (the second scene change information) is extracted for the frame which satisfies the condition. Then, the frame interval and the first scene change information extracted in step S13 are output to the evaluation function calculating unit 13 (step S16).

If it is determined that any of the scene change conditions is not satisfied in step S14 ("NO" in step S14), the process goes to step S17.

In step S17, it is determined whether or not the number of remaining frames (pictures) of encoded data is 3 or more. If it is determined that the number of remaining frames is 3 or more, the next 3 frames of the moving image data are read from the information storing unit 11 (step S18). The process then goes back to step S11.

In this way, all of frames (pictures) of scene changes which satisfy any of the conditions shown in FIGS. 15 through 17 are detected from the encoded moving image data, and the scene change information (the first and the second scene change information) of the frames are output to the evaluation function calculating unit 13.

When the scene change information are input from the information collecting unit 12, the evaluation function calculating unit 13 calculates the value of the evaluation function E(i). This calculation is made based on the above described scene change information and the coefficients C0 through C16, which correspond to the genre of moving image data from which the information collecting unit 12 extracts the scene change information.

The coefficients C0 through C16 are predetermined with a preset method. Namely, the coefficients C0 through C16 are determined with a method, for example, a multivariant analysis method such as determination analysis, etc., an optimization method such as a deepest descent method, a method simulating the activity or the judgment of the brain of a human being such as a neural network, fuzzy inference, etc. If the scene change information has been already stored in the scene change information storing unit 15, the coefficients C0 through C16 are changed according to a change in the genre of a moving image to be reproduced, which is made by a user, etc. The scene change determining unit 14 determines a scene change by making a comparison between the value of the evaluation function E(i), which is calculated by the evaluation function calculating unit 13, and a preset threshold value. Additionally, the scene change determining unit 14 changes the threshold value so as to make the number of presented scene changes equal to a specified number, if scene change information has already been stored in the scene change information storing unit 15.

The scene change information storing unit 15 stores the information of a scene change (scene change information) determined by the scene change determining unit 14. A nonvolatile memory is used as the scene change information storing unit 15.

As described above, the scene change information storing unit 15 provides the moving image reproducing device 10 with the capability for eliminating an overhead to again extract scene change information from the same moving image data. The amount of moving image data is very large, and the process for reading moving image data from the information storing unit 11 requires the longest processing time in the moving image reproducing device 10 according to the first preferred embodiment. Therefore, the processing time of the whole of the moving image reproducing device 10 can be significantly reduced by eliminating this overhead. Accordingly, if the number of presented scene changes or the position of a scene change is changed for the moving image data already stored in the scene change information storing unit 15, the change process can be made faster by executing the process of the flowchart which is explained below and shown in FIG. 20.

Figure 20:
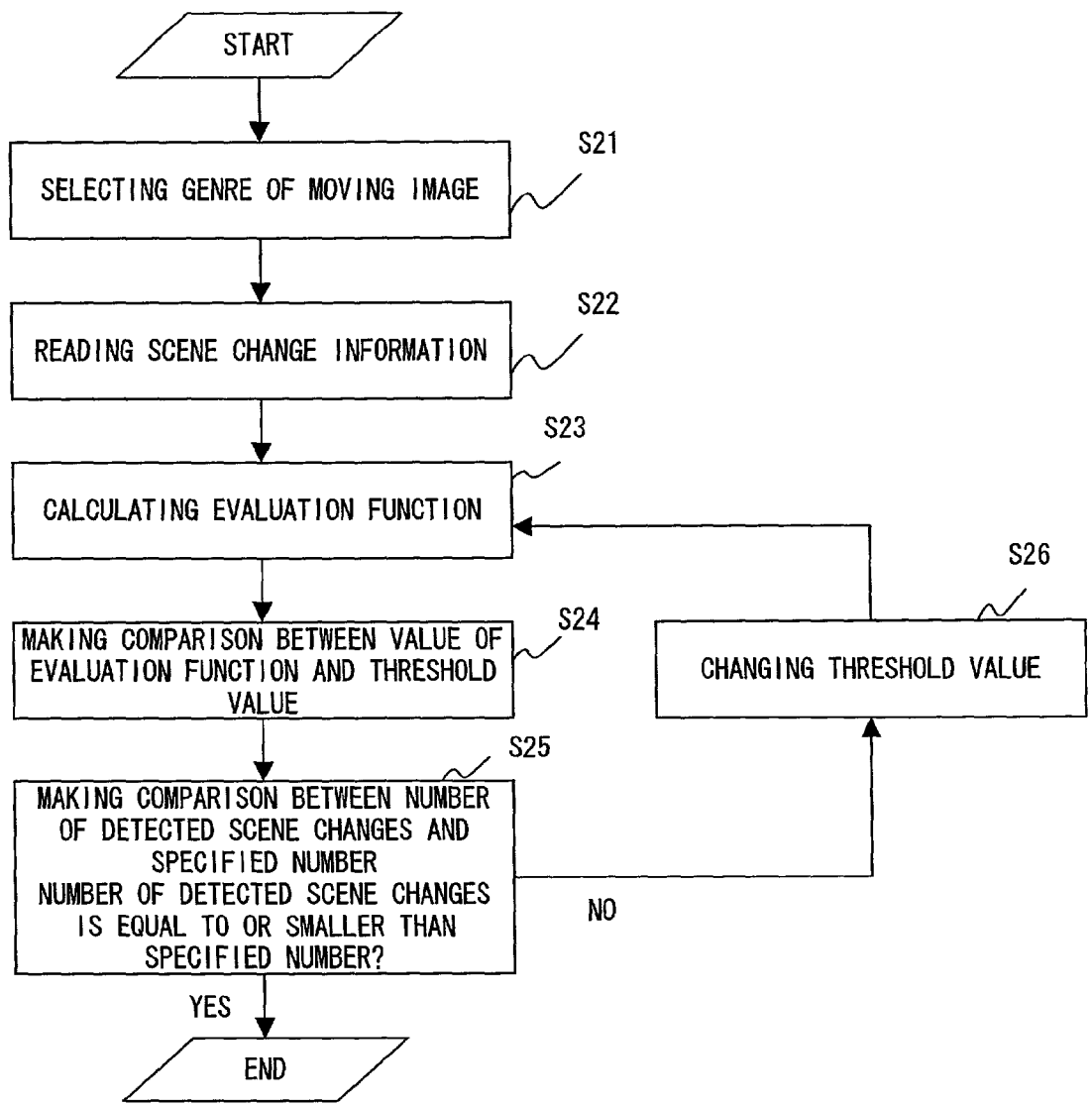
FIG. 20 is a flowchart explaining the operations of the moving image reproducing device according to the first preferred embodiment, when the genre of a moving image and the number of scene changes to be presented are specified in the case where scene change information has already been recorded.

FIG. 20 explains the operations of the first preferred embodiment when scene change information has already been stored in the scene change information storing unit 15.

First of all, when the genre of a moving image is selected, the evaluation function calculating unit 13 sets the coefficients C0 through C16 of the evaluation function E(i) to values corresponding to the genre (step S21).

Next, the evaluation function calculating unit 13 reads scene change information about the selected moving image data from the scene change information storing unit 15 (step S22), and calculates the value of the evaluation function E(i) by using the scene change information (step S23). The operations of steps S23 and S24 are assumed to be performed for the entire scene change information of the selected moving image data that is stored in the scene change information storing unit 15.

Then, the scene change determining unit 14 makes a comparison between the calculated value of the evaluation function E(i) for each scene change information and a threshold value to detect a scene change (step S24).

The scene change determining unit 14 makes a comparison between the number of scene changes of the moving image detected in step S24 and a specified number of scene changes so as to determine whether or not the number of detected scene changes is equal to or smaller than the specified number of scene changes (step S25).

If the number of detected scene changes is larger than the specified number of scene changes ("NO" in step S25), the threshold value of the evaluation function E(i) is changed to make the number of detected scene changes smaller (step S26). The process then goes back to step S23.

In this way, the threshold value of the evaluation function E(i) is changed so that the number of detected A scene changes becomes equal to or smaller than the specified number of scene changes.

In the first preferred embodiment, a scene change can be detected by the information collecting unit 12, the evaluation function calculating unit 13 and the scene change determining unit 14 while the decoding unit 16 reproduces a moving image. As a matter of course, it is possible to suspend the operations of the decoding unit 16, and to store scene change information by the information collecting unit 12, the evaluation function calculating unit 13, the scene change determining unit 14, and the scene change information storing unit 15 without reproducing a moving image in the first preferred embodiment.

Figure 21:
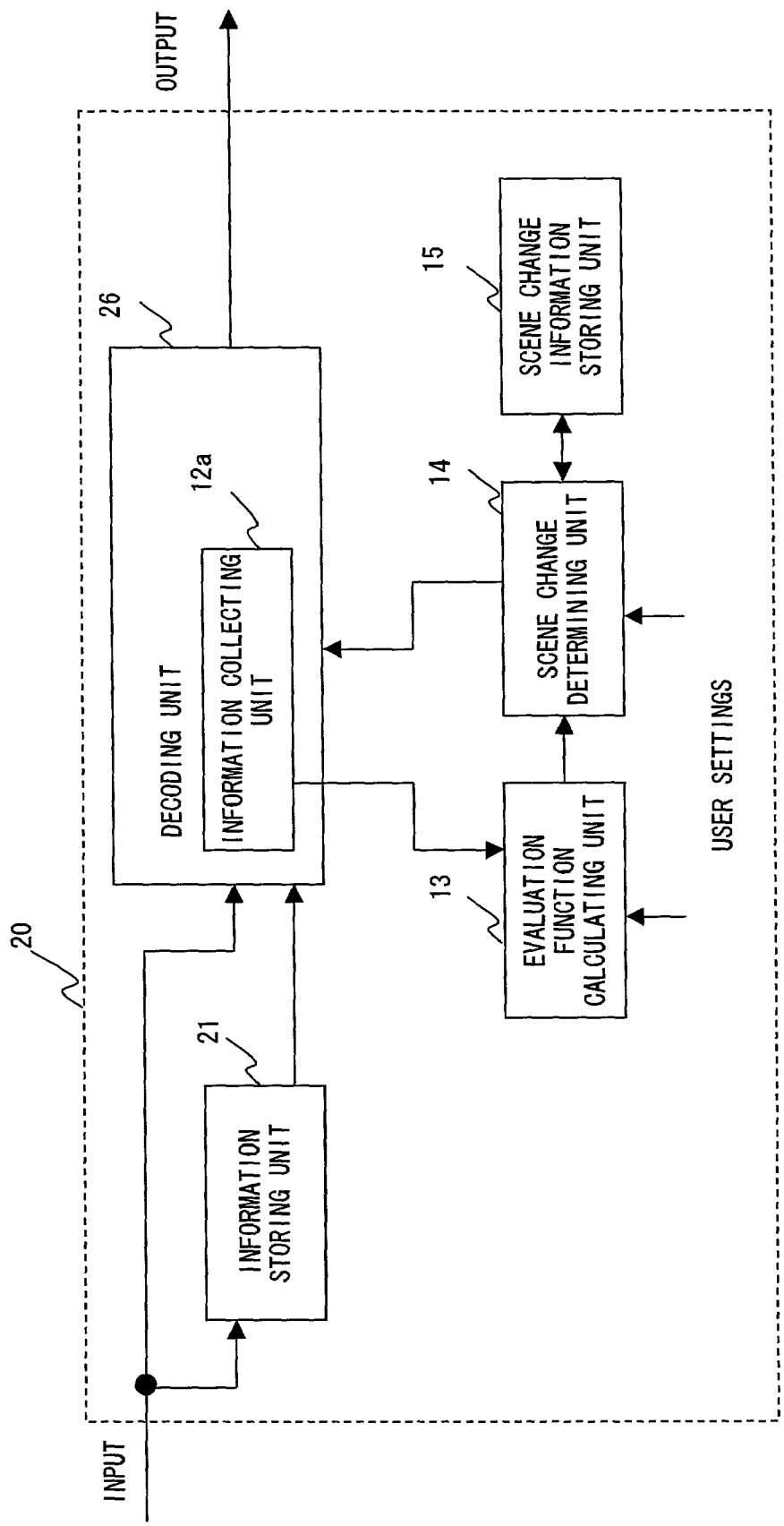
FIG. 21 is a block diagram showing the system configuration of a moving image reproducing device according to a second preferred embodiment of the present invention.

FIG. 21 is a block diagram showing a moving image reproducing device 20 according to a second preferred embodiment of the present invention. In this figure, the same constituent elements as those of the moving image reproducing device 10 according to the first preferred embodiment shown in FIG. 18 are denoted with the same reference numerals, and their explanations are omitted.

In the second preferred embodiment, an information collecting unit 12a having a capability equivalent to the information collecting unit 12 is arranged within a decoding unit 26. The information collecting unit 12 and the decoding unit 16 are arranged as separate blocks in the first preferred embodiment, whereas the information collecting unit 12a is incorporated into the decoding unit 26 in the second preferred embodiment. Although the information collecting unit 12a does not have a capability for restoring a moving image, it decodes a motion vector etc. from picture header information or macroblock header information. As described above, the capabilities common to the decoding unit 16 and the information collecting unit 12 are put into common use, and the information collecting unit 12a is incorporated into the decoding unit 26. By sharing the decoding circuit as described above, the scale of the circuitry of the moving image reproducing device 20 can be made smaller than that of the moving image reproducing device 10 according to the first preferred embodiment. As a result, the cost can be prevented from being increased due to the addition of the scene change detection capability.

Furthermore, the information storing unit 21 outputs encoded moving image data only to the decoding unit 26 (not to the information collecting unit 12 unlike the information storing unit 11 of the moving image reproducing device 10 according to the first preferred embodiment).

Figure 22:
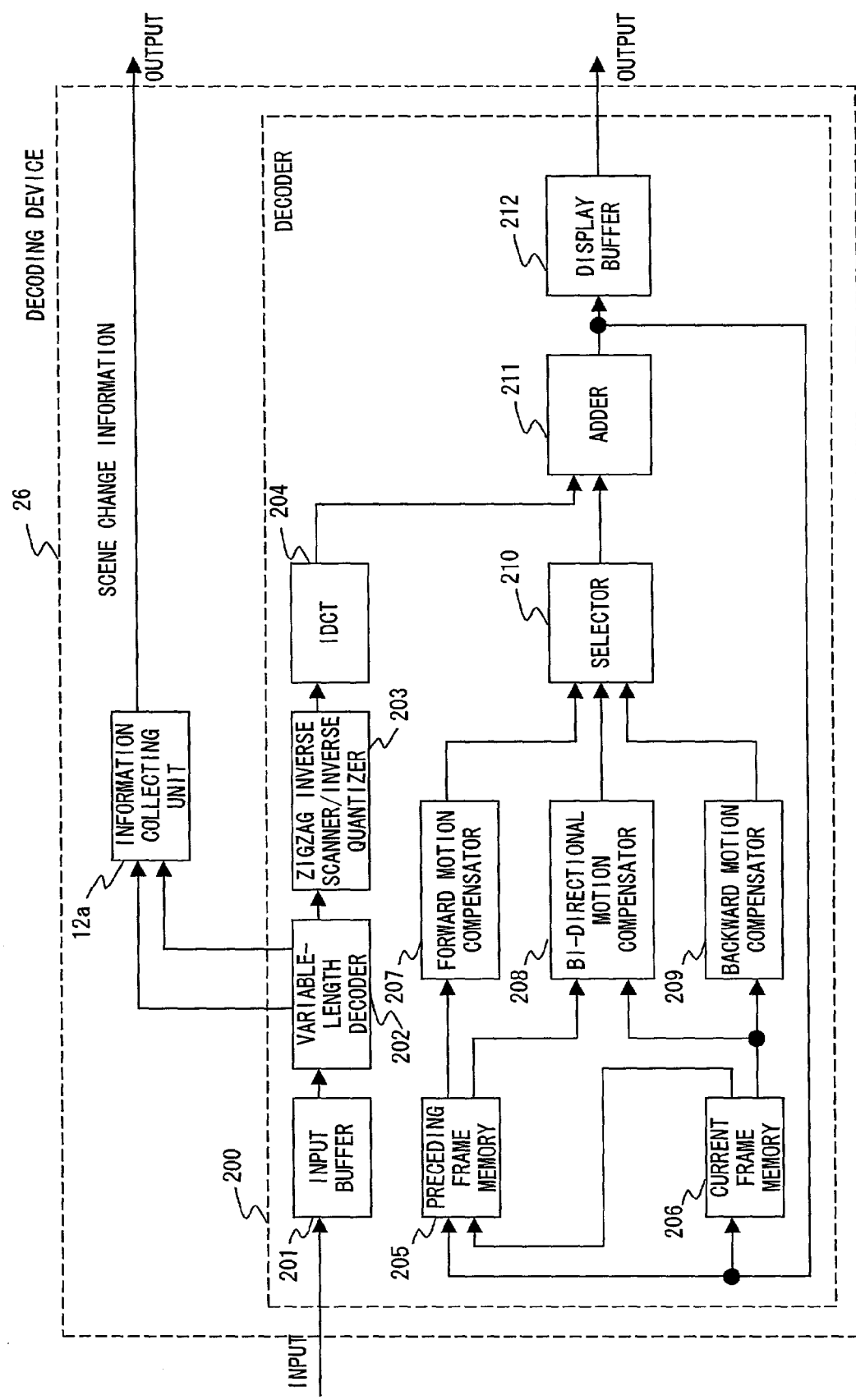
FIG. 22 is a block diagram showing the details of the circuit configuration of a decoding unit of the moving image reproducing device according to the second preferred embodiment.

FIG. 22 is a block diagram showing the configuration of the circuitry of the decoding unit 26.

The decoding unit 26 is composed of a decoder 200 and the information collecting unit 12a.

The decoder 200 comprises an input ubffer 201, a variable-length decoder 202, a zigzag inverse scanner/inverse quantizer 203, an inverse discrete cosine transformer (IDCT) 204, a preceding frame memory 205, a current frame memory 206, a forward motion compensator 207, a bidirecitonal motion compensator 208, a backward motion compensator 209, a selector 210, an adder 211, and a display buffer 212.

The input buffer 201 is a buffer temporarily storing encoded data of an image of a block within a frame (called an original frame) of a moving image that is externally input at a predetermined rate. Additionally, the preceding frame memory 205 is a frame memory for storing the decoded image of a preceding frame, which is required for forward motion compensation and bidirecitonal motion compensation. The current frame memory 206 is a frame memory for storing the decoded image of a frame, which is required for bidirectional motion compensation and backward motion compensation. The original frame falls into I, B, and P pictures.

Encoded data of each block of the moving image, which is stored in the input buffer 201, is decoded by the variable-length decoder 202. As a result of this decoding, picture header information or macroblock header information is output from the variable-length decoder 202 to the information collecting unit 12a. The information collecting unit 12a decodes the magnitudes of motion vectors or extracts the number of motion vectors in a similar manner as in the above described first preferred embodiment.

The variable-length decoder 202 decodes quatized data of a discrete cosine coefficient that is variable-length-encoded for each block. If the original frame is an I picture, the quantized data of the discrete cosine coefficient of an image of a block is decoded. However, if the original frame is a B or a P picture, the quantized data of the discrete cosine coefficient of the differential image of a block is decoded.

The quantized data that is decoded by the variable-length decoder 202 is inversely quantized while being zigzag-scanned by the zigzag inverse scanner/inverse quantizer 203 in an order reverse to that of encoding. In this way, the zigzag inverse scanner/inverse quantizer 203 decodes the encoded image data (for an I picture) of each block or the discrete cosine coefficient of differential image data (for a B or a P picture).

The decoded discrete cosine coefficient is inversely cosine-transformed by the IDCT 204, and the image data (in case of the I picture) or the differential image data (in case of the B or the P picture) of the block is decoded. The image data or the differential image data of the block is input to the adder 211.

The adder 211 is intended to restore the image data of each block within a frame. If image data of a block of an I picture is input, the image data is output to the display buffer 212 unchanged, and also to the preceding frame memory 205 and the current frame memory 206. With the MPEG, since the initial picture when image data is decoded is an I picture in encoded data of a moving image, the image of the I picture is restored by the decoder 200, and the restored image is stored in the preceding frame memory 205. Additionally, the restored image of the I picture is stored in the display buffer 212.

As described above, the image data of an I picture is restored in blocks, whereas the image of a P picture is restored by the forward motion compensator 207 by using the restored image of an I or a P picture which is previously restored and stored in the preceding frame memory 205.

The forward motion compensator 207 reads forward prediction block image data from the preceding frame memory 205 based on a decoded forward motion vector (a forward prediction motion vector), and outputs the read data to the selector 210. The selector 210 selects and outputs the output from the forward motion compensator 207 when the image of a P picture is restored. Then, the forward prediction block image data of the P picture, which is output from the forward motion compensator 207, and the differential block image data of the P picture, which is output from the IDCT 204, are added by the adder 211, so that the image of the P picture is restored in blocks by the adder 211, so that the image of the P picture is restored by the adder 21 in units of blocks. The block image data of the P picture restored thus is stored in the display buffer 212, and also stored in the preceding frame memory 205 or the current frame memory 206. In this case, the process for making the image data of the P picture stored in the preceding frame memory 205 always precede the image data of the P picture stored in the current frame memory 206 is performed. For example, when the image data of a new P picture is stored in the current frame memory 206, the image data of the new P picture is stored in the current frame memory 206 after the image data of a P picture which is previously restored and stored in the current frame memory 206 is transferred to the preceding frame memory 205.

Furthermore, the image of a B picture is restored based on the image data of a preceding frame (an I or a P picture) stored in the preceding frame memory 205 and the image data of a current frame (P picture) stored in the current frame memory 206. When moving image data is encoded, a B picture is encoded after an I or P picture which is subsequent in terms of time in an original image. Therefore, the image data of the I or the P picture which is subsequent in terms of time in an original image has been already restored and is stored in the current frame memory 206, when the B picture is decoded. Additionally, the image data of an I or a P picture is prior in terms of time in the original image has already been stored in the preceding frame memory 205.

The bidirectional motion compensator 208 reads the forward prediction block image data of a B picture from the preceding frame memory 205 based on decoded forward motion vector (forward prediction motion vector). Furthermore, the bidirectional motion compensator 208 reads the backward prediction block image data of the B picture from the current frame memory 206 based on a decoded backward motion vector (backward prediction motion vector). Then, the bidirectional motion compensator 208 generates the prediction block image data of the B picture from the forward prediction block image data and the backward prediction block image data, and outputs the generated data to the selector 210. The selector 210 outputs the prediction block image data of the B picture output from the bidirectional motion compensator 208 to the adder 211 when the image data of the B picture is restored. The adder 211 adds the prediction block image data of the B picture input from the selector 210 and the differential block image data of the B picture input from the IDCT 204, and restores the block image data of the B picture. Then, the adder 211 outputs the restored block image data of the B picture to the display buffer 212. In this way, the restored block image data of the B picture is stored in the display buffer 212.

When a B picture is encoded not with bidirectional motion prediction but with backward motion prediction, the backward motion compensator 209 generates the prediction block image data of the B picture from the image data of a P picture stored in the current frame memory 206 based on a decoded backward motion vector (backward prediction motion vector). The prediction block image data of the B picture, which is generated by the backward motion compensator 209, is selected by the selector 210, and output to the adder 211. The adder 211 adds the prediction block image data of the B picture input from the selector 210 and the differential block image data of the B picture input from the IDCT 204 to restore the block image data of the B picture. The restored block image data of the B picture is output from the adder 211 to the display buffer 212, and stored in the display buffer 212.

Figure 19:
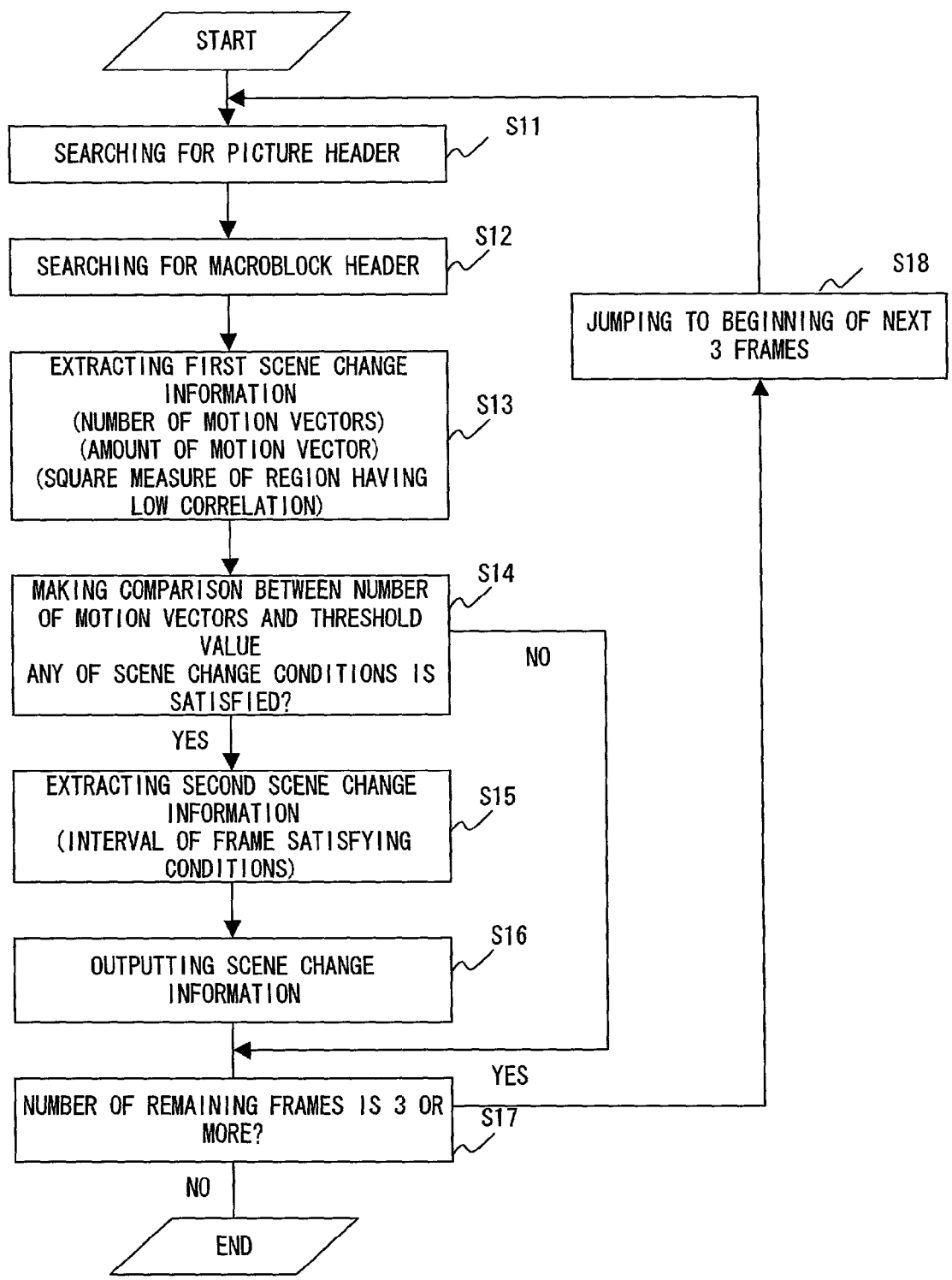
FIG. 19 is a flowchart explaining the operations of an information collecting unit of the moving image reproducing device according to the first preferred embodiment.

The information collecting unit 12a performs the process of the flowchart shown in FIG. 19 based on the macroblock header information and the picture header information, which are input from the variable-length decoder 202, to detect a frame which satisfies scene change conditions, and outputs the scene change information (the number and the magnitudes of motion vectors, the square measure of a region having a low correlation with a preceding/succeeding frame, the number of bidirectionally predicted regions, and a frame interval) of the detected frame to the evaluation function calculating unit 13.

With the above described configuration, a scene change can be detected in the second preferred embodiment in a similar manner as in the first preferred embodiment.

Next, a moving image reproducing device according to a third preferred embodiment of the present invention is explained.

Figure 23:
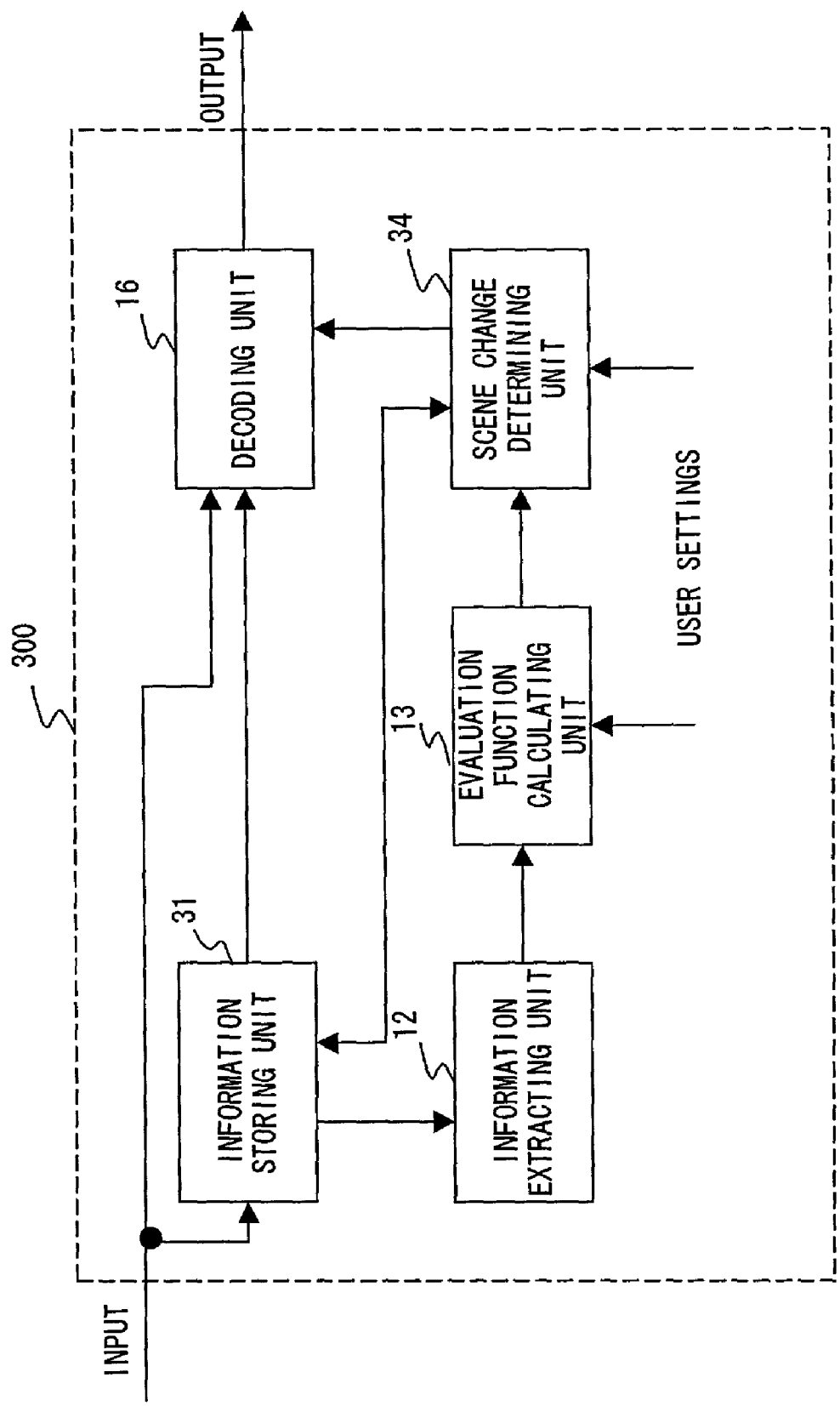
FIG. 23 is a block diagram showing the system configuration of a moving image reproducing device according to a third preferred embodiment of the present invention.

FIG. 23 is a block diagram showing the system configuration of a moving image reproducing device 300 according to the third preferred embodiment. In this figure, the same constituent elements as those of the moving image reproducing device 10 according to the first preferred embodiment shown in FIG. 18 are denoted with the same reference numerals, and their explanations are omitted.

In the moving image reproducing device 10 according to the first preferred embodiment, the information storing unit 11 and the scene change information storing unit 15 are separately arranged. In the meantime, in the moving image reproducing device 300 according to the third preferred embodiment, an information storing unit 31 is configured as a storage device, to which data is rewritable and the scene change information of the scene that a scene change determining unit 34 determines as a scene change is recorded.

As described above, in the moving image reproducing device 300 according to the third preferred embodiment, the cost increased due to an addition if the scene change detection capability can be prevented from rising, by achieving the commonality of the information storing unit and the scene change information storing unit.

As the information storing unit 31, a storage device into which a removable storage medium such as an optical disk, a magneto-optical disk, a magnetic disk, etc. can be inserted is available. If such a storage device is adopted as the information storing unit 31, scene change information of encoded moving image data to be recorded in the information storing unit 31 can be generated by an external information processing device such as a personal computer, a workstation, etc., and the scene change information can be recorded along with the moving image data.

Note that the above described external information processing device generates the scene change information of encoded moving image data, for example, by executing a program implementing the scene change detection process shown in FIG. 19. The scene change detection process shown in FIG. 19 may be implemented also by dedicated hardware (a DSP, an ASIC, a system LSI, etc.).

Encoded moving image data and its scene change information are stored in the information storing unit 31, so that the processing time required until the scene change determining unit 34 detects a scene change can be reduced. Namely, for example, the process of the information collecting unit 12 can be omitted. Also the process of the evaluation function calculating unit 13 may be omitted depending on a case, and the scene change determining unit 34 may notify the decoding unit 16 of the frame of a scene change based on the scene change information read from the information storing unit 31. In this case, the decoding unit 16 can quickly restore the image of the frame of the notified scene change.

If a user specifies the number of scene changes for the scene change determining unit 34, the scene change determining unit 34 changes the threshold value of the evaluation function E(i) by executing the process of the flowchart shown in FIG. 20, and detects scene changes the number of which is equal to the number specified by the user. At this time, as described above, in the system where encoded moving image data and its scene change information are recorded to the information storing unit 31, the evaluation function calculating unit 13 can be configured to read scene change information directly from the information storing unit 31 not via the information collecting unit 12.

With such a configuration, the speed of scene change detection can be improved.

Next, a moving image reproducing device according to a fourth preferred embodiment of the present invention is explained.

Figure 24:
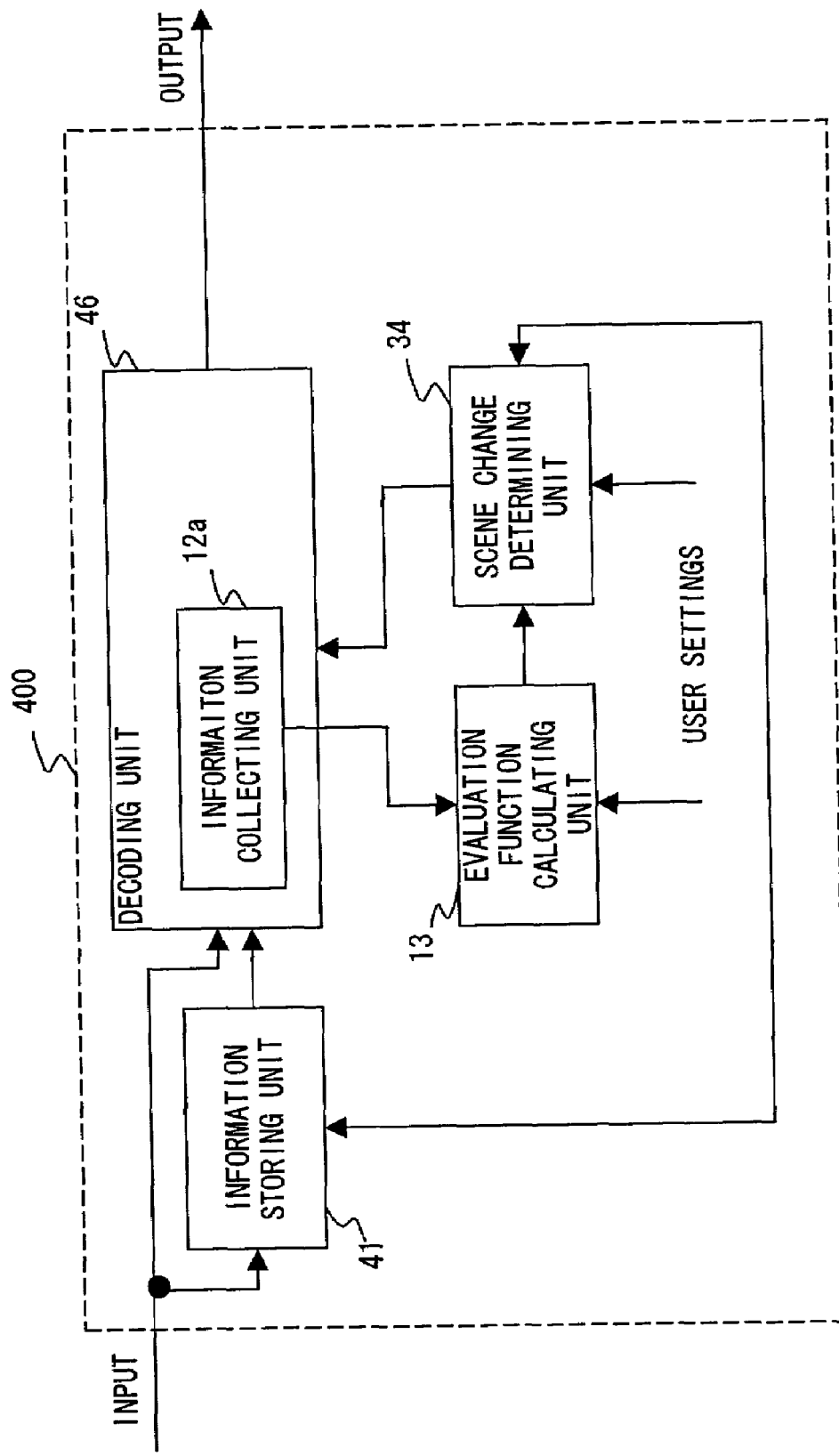
FIG. 24 is a block diagram showing the system configuration of a moving image reproducing device according to a fourth preferred embodiment of the present invention.

FIG. 24 is a block diagram showing the system configuration of a moving image reproducing device 400 according to the fourth preferred embodiment of the present invention.

The moving image reproducing device 400 has a configuration into which the moving image reproducing device 20 according to the second preferred embodiment shown in FIG. 21 and the moving image reproducing device 300 according to the third preferred embodiment shown in FIG. 23 are combined. An information storing unit 41 records encoded moving image data similar to the information storing unit 31 shown in FIG. 23, and also records scene change information of a scene that the scene change determining unit 34 detects as a scene change.

A decoding unit 46 has a configuration similar to that of the decoding unit 26 of the moving image reproducing device 200 shown in FIG. 21, and includes an information collecting unit 12a. Namely, the moving image reproducing device 400 according to the fourth preferred embodiment does not separately comprise the information collecting unit 12, unlike the moving image reproducing device 10 according to the first preferred embodiment or the moving image reproducing device 300 according to the third preferred embodiment.

As described above, the moving image reproducing device 400 according to the fourth preferred embodiment has the advantage of the moving image reproducing device 20 according to the second preferred embodiment and that of the moving image reproducing device 300 according to the third preferred embodiment, and its device cost can be therefore made lower than those of the moving image reproducing devices 20 and 300.

Next, a fifth preferred embodiment according to the present invention is explained.

The moving image reproducing device according to the present invention can be implemented by software (a program) and a CPU executing the software, or by software (a program) and a computer executing the software.

Figure 25:
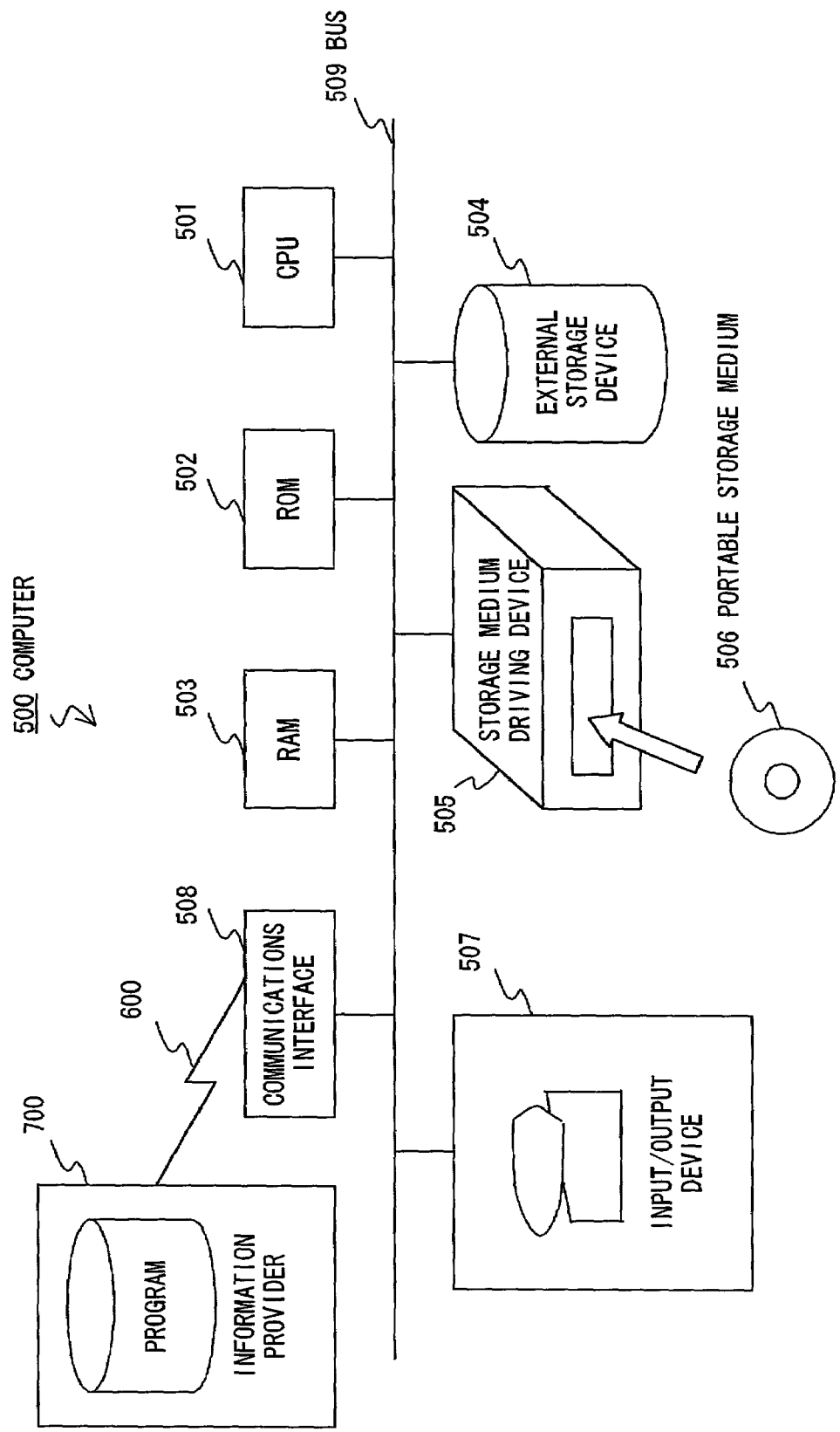
FIG. 25 is a block diagram showing the system configuration of a moving image reproducing device according to a fifth preferred embodiment of the present invention.

FIG. 25 is a block diagram showing the system configuration of a computer 500, which is a moving image reproducing device according to a fifth preferred embodiment of the present invention.

The computer 500 is configured by a CPU 501, and a ROM 502, a RAM 503, an external storage device 504, a storage medium driving device 505, an input/output device 507, and a communications interface 507, which are connected to the CPU 501 by a bus 509.

The CPU 501 executes the processes, which are represented by the flowcharts shown in FIGS. 26 and 27 and will be described later, by executing a program loaded into the RAM 503. The program is stored in the ROM 501, the external storage device 504, or onto a portable storage medium 506 inserted into the storage medium driving device 505. Or, the program is downloaded into the external storage device 504 or the portable storage medium 506, etc., which is inserted into the storage medium driving device 505, from an information provider 700 that is connected to the computer 500 by a network 600. Encoded moving image data is recorded onto the external storage device 504 or the portable storage medium 506 inserted into the storage medium driving device 505.

The input/output device 507 is composed of an input device having a keyboard, a pointing device such as a mouse, etc., and a display device such as a CRT display, an LCD, etc. A user specifies the start and the end of execution of the program according to this preferred embodiment, the selection of the genre of a moving image to be reproduced, the number of scene changes to be detected from the moving image, etc.

Figure 26:
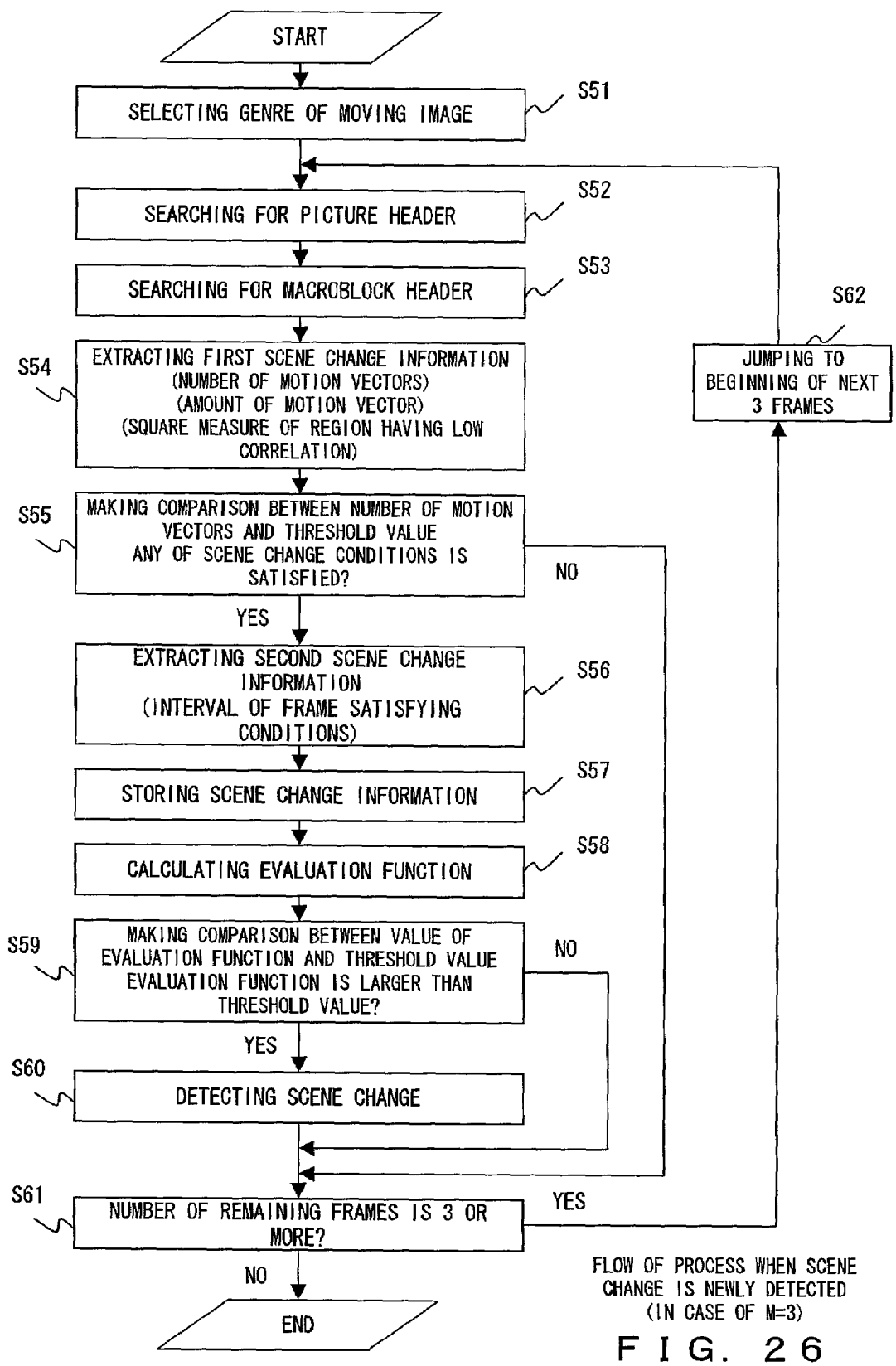
FIG. 26 is a flowchart explaining the flow of the process performed when a scene change is newly detected in the moving image reproducing device according to the fifth preferred embodiment of the present invention.
Figure 27:
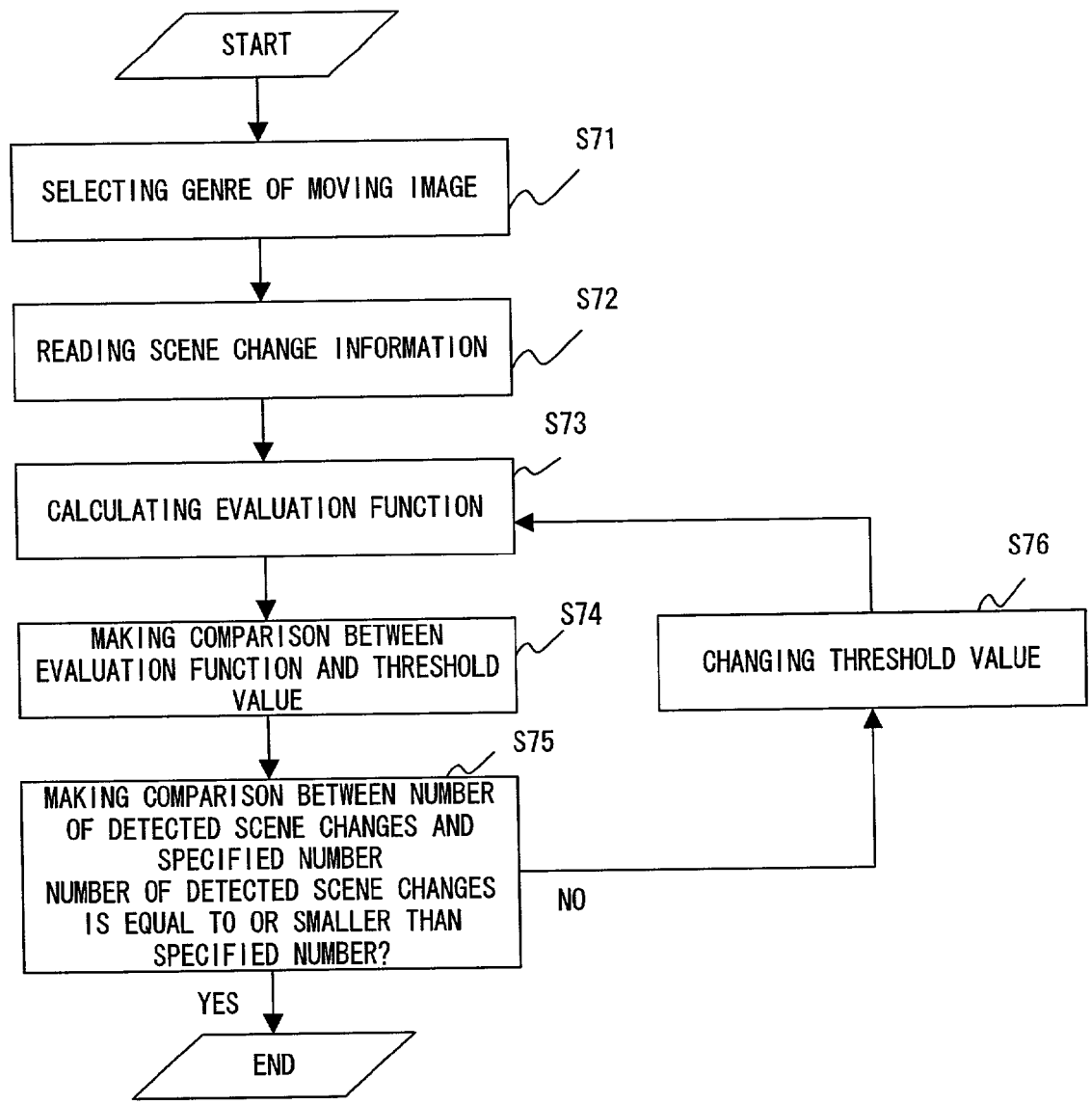
FIG. 27 is a flowchart explaining the flow of the process performed when the number of scene changes to be presented is changed in the moving image reproducing device according to the fifth preferred embodiment of the present invention.

FIGS. 26 and 27 are flowcharts explaining the processes executed by the computer 500 according to the fifth preferred embodiment of the present invention. The CPU 501 executes the program loaded into the RAM 503, so that the processes represented by these flowcharts are performed.

FIG. 26 is a flowchart showing the flow of the process in which the computer 500 newly detects a scene change from the encoded data of a moving image recorded in the external storage device 504. It should be remembered that this figure is a flowchart in the case where the cycle M of I and P pictures is 3.

Firstly, a user selects the genre of a moving image from which a scene change is to be detected, via the input/output device 507 (step S51).

As a result, the encoded moving image data of the selected genre is read from the external storage device 504, and the picture header of the moving image data is searched (step S52). Next, the macroblock header of the moving image data is searched (step S53).

Since the operations of steps S52 and S53 are similar to those of steps S11 and S12 of the above described flowchart shown in FIG. 19, their detailed explanations are omitted here.

Next, scene change information is extracted for each picture based on the results of the operations of steps S52 and S53 (step S54). Also the operation of step S54 is similar to that of step S13 of the above described flowchart shown in FIG. 19. The first scene change information of each frame, that is, the numbers of motion vectors (the number of forward prediction motion vectors, and the number of backward prediction motion vectors), the magnitude of each motion vector, a square measure having a low correlation with a preceding/succeeding frame, and the number of bidirecitonally predicted regions are extracted in step S54.

The operations of steps S52 through S54 are performed for 3 consecutive frames, and it is then determined whether or not these 3 frames satisfy any of the conditions shown in FIGS. 15 through 17 (step S55).

The operation of step S55 is similar to that of step S14 of the flowchart shown in FIG. 19. It is first determined whether or not the numbers of bidirectionally predicted regions of the initial 2 frames are minimal, in order to reduce the number of comparison operations. If this condition is satisfied, it is determined whether or not the number of forward prediction motion vectors and that of backward prediction motion vectors satisfy any of the conditions shown in FIGS. 15 through 17 for these 3 frames.

If none of the conditions is satisfied ("NO" in step S55), the process goes to step S61.

Or, if it is determined that any of the conditions is satisfied ("YES" in step S55), a frame interval to a frame from which a scene change is detected (the second scene change information) is calculated for the frame which is a scene change point, and the scene change information including this frame interval, to which the first scene change information that is extracted in step S54 is added, is recorded and stored in the external storage device 504 (step S57).

As described above, the scene change information is stored in the external storage device 504 for a scene change frame which satisfies any of the conditions shown in FIGS. 15 through 17, and the scene change information is reused thereafter.

Next, the value of the evaluation function E(i) is calculated based on the scene change information (step S58), and it is determined whether or not the value of the evaluation function E(i) is larger than a threshold value (step S59).

If the value of the evaluation function E(i) is equal to or smaller than the threshold value ("No" in step S59), the process goes to step S61. If the value of the evaluation function E(i) is larger than the threshold value, it is determined that a scene change is detected. Therefore, the operations such as presentation of the image of the scene change frame to a user via the input/output device 507, etc. are performed (step S60).

Next, it is determined whether or not the number of remaining frames (pictures) of encoded moving image data stored in the external storage device 504 is equal to or larger than 3 (step S61). If the number of remaining frames is equal to or larger than 3, the next 3 frames (pictures) are read from the external storage device 504 (step S62). The process then goes back to step S52.

As described above, the loop process from step S52 to step S61 is repeated to detect a scene change of the moving image until the number of remaining frames (pictures) of moving image data becomes smaller than 3 for the encoded moving image data of a selected genre, and at the same time, a frame which satisfies any of the conditions shown in FIGS. 15 through 17 is extracted from the frames (pictures) of the moving image, and the scene change information about the extracted frame is stored in the external storage device 504.

FIG. 27 is a flowchart showing the process flow of the computer 500 that detects a scene change by using scene change information, if the scene change information has already been stored in the external storage device 504 with the process of the flowchart shown in FIG. 26, etc. It is assumed that the number of scene changes to be presented is preset with user specification, etc. prior to the execution of the process of this flowchart.

Firstly, a user selects the genre of a moving image from which a scene change is detected via the input/output device 507 (step S71). Next, all items of the scene change information of the moving image of the selected genre are read from the external storage device 504 (step S72).

Then, the value of the evaluation function E(i) is calculated for each scene change information item (step S73), and the value of the evaluation function E(i) of each scene change information item is compared with the current threshold value (step S74). Then, the number of the scene change information (the number of scene changes) whose evaluation function E(i) value is larger than the current threshold value is obtained, and it is determined whether or not the obtained number of scene changes is equal to or smaller than the number of scene changes, which is specified beforehand (step S75).

If the detected number of scene changes is larger than the specified number of scene changes, the current threshold value is changed to a larger value (step S75) The process then goes back to step S73.

As described above, the threshold value is changed so that the detected number of scene changes becomes equal to or smaller than a specified number of scene changes for the moving image of a selected genre, and finally, scene changes the number of which is equal to or smaller than the specified number are detected. The scene changes determined finally are presented to a user, for example, via the input/output device 507.

Next, a sixth preferred embodiment according to the present invention is explained.

Figure 28:
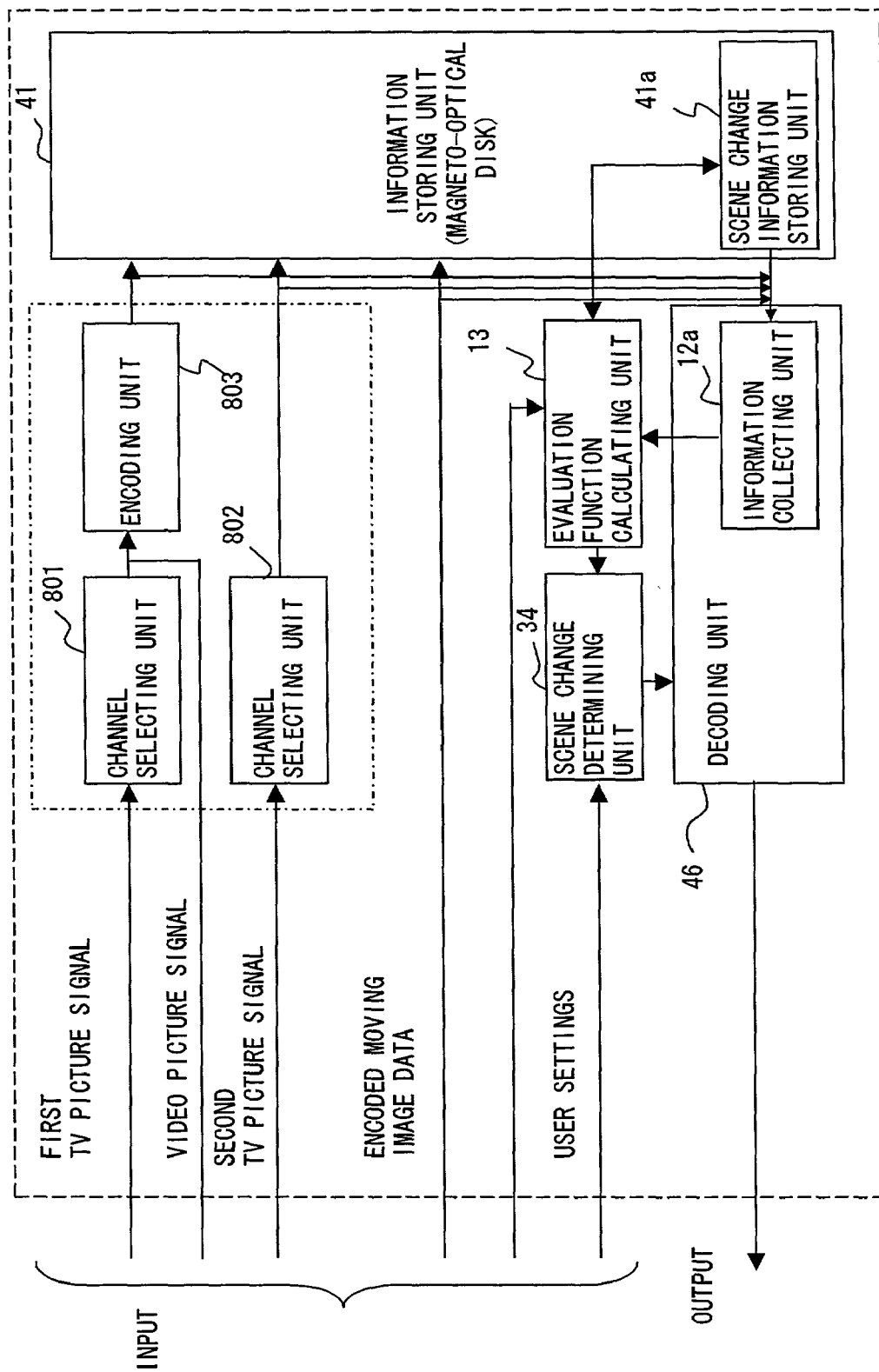
FIG. 28 is a block diagram showing the system configuration of a moving image recording/reproducing device according to a sixth preferred embodiment of the present invention.

FIG. 28 is a block diagram showing the system configuration of a moving image recording/reproducing device 800 according to the sixth preferred embodiment of the present invention.

The moving image recording/reproducing device 800 is implemented by adding the capability for receiving a TV (television) picture signal (a first TV picture signal) and a TV picture signal (a second TV picture signal) using encoded moving image data, the capability for inputting/outputting a video picture signal, and the capability for encoding and recording the first TV picture signal and the video picture signal, to the moving image reproducing device 400 according to the fourth preferred embodiment shown in FIG. 24.

The first TV picture signal is, for example, a picture signal in an analog TV broadcast or a digital TV broadcast. The second TV picture signal is, for example, a picture signal in a digital broadcast using encoded moving image data. The video picture signal is, for example, a picture signal captured by an analog or a digital video camera.

A channel selecting unit (a first channel selecting unit) 801 is a receiver that comprises a tuner receiving the first TV picture signal. The channel selecting unit 801 selects the first TV picture signal of each channel, and outputs the received first TV picture signal to an encoding unit 803.

A channel selecting unit (a second channel selecting unit) 802 is a receiver that comprises a tuner receiving the second TV picture signal, a demodulator, an error corrector, etc. The channel selecting unit 802 selects the second TV picture signal of each channel, demodulates the received second TV picture signal, and outputs and records the demodulated signal to an information storing unit 41.

An encoding unit 302 encodes the first TV picture signal input from the channel selecting unit 801 or the video picture signal, which is input from the channel selecting unit 801, with the MPEG, etc., and outputs and records the moving image data obtained with encoding to the information storing unit 41. Additionally, the outputs of the channel selecting unit 802 and the encoding unit 803, and encoded moving image data that is externally input are output to an information collecting unit 12a within a decoding unit 46.

The information collecting unit 12a extracts scene change information from the input data (the encoded moving image data), and outputs the extracted information to an evaluation function calculating unit 13. The evaluation function calculating unit 13 calculates the evaluation function E(i) based on the scene change information input from the information collecting unit 12a, and outputs the calculated value to a scene change determining unit 34. The scene change determining unit 34 detects a scene change frame by making a comparison between the value of the evaluation function E(i) input from the evaluation function calculating unit 13 and a threshold value.

Additionally, the information collecting unit 12a outputs and records the extracted scene change information to a scene change information storing unit 41a arranged within the information storing unit 41. Furthermore, the evaluation function calculating unit 13 evaluates the scene change information stored in the scene change information storing unit 41a, calculates the evaluation function E(i) based on the read information, and outputs the calculated value to the scene change determining unit 34.

The scene change determining unit 34 determines scene changes the number of which is equal to the number of scene changes, which is set by a user, by making a comparison between the value of the evaluation function E(i) input from the evaluation function calculating unit 13 and a threshold value, and notifies the decoding unit 46 of the frames of the scene changes. The decoding unit 46 reads the encoded data of the frames, which are notified from the scene change determining unit 34, from the information storing unit 41, decodes the data, and outputs the images of the frames of the scene changes.

The information storing unit 41 is, for example, a magneto-optical disk device. The magneto-optical disk is smaller in size than other storage media, and superior in portability. Because its performance does not deteriorate semipermanently despite repeated recording/reproduction in comparison with a magnetic tape, etc., the durability is high.

Additionally, since the magneto-optical disk device has a short seek time and a high access speed, it is superior in high-speed accessibility. The magneto-optical disk device also has a fast data transfer speed. Therefore, the capabilities for recording and reproducing a moving image can be enhanced by adopting the magneto-optical disk device as the information storing unit 41.

For example, it becomes possible to simultaneously record at least 2 channels of pictures such as analog TV broadcast, digital TV broadcast, video camera pictures, etc. by taking advantage of the characteristic that the data transfer speed of the magneto-optical disk device is sufficiently faster than the total speed of the read and write speeds of data from/to a magneto-optical disk. Also, it becomes possible to reproduce one picture while recording another picture. Namely, if a picture of a program is recorded, the picture of the program can be reproduced and viewed from anywhere while recording the program.

With the moving image recording/reproducing device 800, a scene change of a program can be detected while recording the program. Additionally, a broadcast picture signal or a video picture signal is recorded in the information storing unit 41, and encoded moving image data being recorded or already recorded is read from the information storing unit 41 to allow a scene change of the moving image to be detected. Furthermore, a scene change is detected from encoded moving image data that is input from the encoding unit 803, the channel selecting unit 802, or is externally input, and only the scene change information may be recorded to the scene change information storing unit 41a. Still further, a scene change of one moving image may be detected while another moving image is reproduced.

Notice that a moving image recording/reproducing device similar to the moving image recording/reproducing device 800 according to the sixth preferred embodiment may be configured by using any of the first through the third moving image reproducing devices instead of the moving image reproducing device 400 according to the fourth preferred embodiment.

As the information storing unit 41, not a magneto-optical disk device, but, for example, a magnetic disk device may be available.

The present invention can be implemented by any of hardware, firmware, and software, or can be implemented as an IP (Intellectual Property) of a system LSI. Additionally, the present invention may be incorporated into an STB (Set Top Box) or a personal computer.

As described above, according to the present invention, a scene change is determined by collecting the second information about the correlation with a preceding/succeeding frame without decoding an image in addition to the first information about a motion vector for each frame without decoding an image, by calculating the value of an evaluation function which includes the first and the second information as parameters, and by making a comparison between the calculated value and a threshold value. As a result, a scene change can be detected at higher speed and with higher accuracy than with conventional techniques.

Furthermore, the evaluation function is defined to be a function into which parameters are linearly combined with coefficients which are respectively assigned to the parameters, and the coefficients of the parameters of the evaluation function are changed according to the contents (genre) of moving image data from which a scene change is to be detected, so that scene change detection according to the characteristic of each moving image type can be implemented, and a scene change can be accurately detected from a moving image of every genre.

Still further, the evaluation function is defined to be a function having an offset constant, whereby a scene change can be accurately detected by adjusting the constant even for a reduced image, etc. such as an inserted and synthesized image.

Still further, the number of times of the calculation operation of an evaluation function is reduced by collecting the number of bidirectionally predicted regions having both a forward prediction motion vector and a backward prediction motion vector for each frame, and by calculating the evaluation function for a frame of a frame group which satisfies a condition that the numbers of bidirectionally predicted regions in consecutive frames are small, whereby scene change detection can be made faster while maintaining the accuracy of the scene change detection.

Still further, the number of bidirectionally predicted regions having both a forward prediction motion vector and a backward prediction motion vector in each frame of the frame group is added as a parameter of the evaluation function, thereby defining the evaluation function E to be a more suitable function. As a result, the accuracy of scene change detection can be further improved.

Still further, also an appearance interval of a frame which becomes a scene change within a frame group which satisfies a condition that the numbers of bidirectionally predicted regions in consecutive frames are small is added as a parameter of the evaluation function in addition to the number of bidirectionally predicted regions, thereby further improving the accuracy of scene change detection.

Still further, a scene change is detected while the value of the evaluation function is calculated with scene change information after the scene change information which includes the first and the second information, and the frame interval is stored, thereby further speeding up scene change detection.

Still further, a threshold value compared with the value of an evaluation function is changed according to a specified number of scene changes, whereby, for example, only a specified number of scene changes with a high degree of importance can be presented to a user.

Still further, a scene change is determined by storing, as scene change information, the first and the second information of a frame within a frame group which satisfies a condition that the numbers of bidirectionally predicted regions in consecutive frames are small, and the appearance interval of a frame which becomes a scene change, by calculating the value of an evaluation function with the stored scene change information, and by making a comparison between the calculated value of the evaluation function and a threshold value, so that the storage amount of the scene change information can be reduced, and scene change detection with high accuracy can be made faster.

Still further, a scene change is detected by using the value of an evaluation function, to which the appearance interval of a frame that becomes a scene change is added as a parameter in addition to the first and the second information, thereby improving the detection accuracy of a scene change.

Still further, only an image of a scene change frame can be restored at high speed.

The present invention may be widely available for detecting a scene change of encoded moving image data. Application fields include a moving image searching system and a moving image editing system. Additionally, the present invention may be available also to a moving image reproducing device.

What is claimed is:

1. A moving image processing device, comprising:
   an information collecting unit collecting first information about a motion vector for each frame from moving image data which is compressed with inter-frame prediction encoding, and for also collecting second information about a correlation with a preceding/succeeding frame without decoding an image for each frame;
   an evaluation function calculating unit calculating a value of an evaluation function which includes the first and the second information collected by said information collecting unit as parameters only for a frame within a frame group which satisfies a condition that the numbers of bidirectionally predicted regions in consecutive frames are small; and
   a scene change determining unit determining a scene change by making a comparison between the value of the evaluation function, which is calculated by said evaluation function calculating unit, and a threshold value.

2. The moving image processing device according to claim 1, wherein:
   said information collecting unit collects a scene change interval; and
   said evaluation function calculating unit calculates the value of the evaluation function which includes the first and the second information, and the scene change interval as parameters.

3. The moving image processing device according to claim 2, further comprising
   a scene change information storing unit storing the first and the second information, and the scene change interval as scene change information.

4. The moving image processing device according to claim 3, wherein
   said evaluation function calculating unit calculates the value of the evaluation function by using the scene change information read from said scene change information storing unit; and
   said scene change determining unit determines a scene change by making a comparison between the calculated value of the evaluation function and a threshold value.

5. The moving image processing device according to claim 1, wherein said information collecting unit collects the first information about a motion vector for each frame from first header information, which is added in units of frames of the compressed moving image data, and second header information, which is added in units of constituent elements of the frame, without decoding an image of the frame.

6. The moving image processing device according to claim 1, wherein said information collecting unit collects the second information about a correlation with a frame preceding/succeeding each frame from first header information, which is added in units of frames of the compressed moving image data, and second header information, which is added in units of constituent elements of the frame, without decoding an image of the frame.

7. The moving image processing device according to claim 1, wherein the evaluation function is a function into which parameters are linearly combined with coefficients that are respectively assigned to the parameters.

8. The moving image processing device according to claim 1, wherein said information collecting unit outputs the number of bidirectionally predicted regions having both a forward prediction motion vector and a backward prediction motion vector in each frame within a frame group to said evaluation function calculating unit as a parameter of the evaluation function.

9. The moving image processing device according to claim 1, wherein said information collecting unit collects an appearance interval of a frame that becomes a scene change within a frame group which satisfies a condition that the number of bidirectionally predicted regions in consecutive frames are small, and outputs the appearance interval of the frame to said evaluation function calculating means as a parameter of the evaluation function.

10. The moving image processing device according to claim 9, further comprising:
a scene change information storing unit storing, as scene change information, the first and the second information of a frame within a frame group which satisfies a condition that the number of bidirectionally predicted regions in consecutive frames are small, and the appearance interval of the frame which becomes a scene change.

11. The moving image processing device according to claim 10, wherein:
said evaluation function calculating unit calculates the value of the evaluation function by using the scene change information read from said scene change information storing unit; and
said scene change determining unit determines a scene change by making a comparison between the calculated value of the evaluation function and a threshold value.

12. The moving image processing device according to claim 1, wherein the first information is the number and magnitudes of motion vectors, whereas the second information is a square measure of a region having a low correlation with a preceding/succeeding frame.

13. The moving image processing device according to claim 1, wherein the evaluation function is a function whose parameters are determined according to an appearance cycle of an intra-frame encoded frame or a forward predicted frame in the encoded moving image data.

14. A moving image processing method, comprising:
collecting first information about a motion vector for each frame from moving image data which is compressed with inter-frame prediction encoding;
collecting second information about a correlation with a preceding/succeeding frame without decoding an image of each frame;
calculating a value of an evaluation function which includes the first and the second information as parameters only for a frame within a frame group which satisfies a condition that the numbers of bidirectionally predicted regions in consecutive frames are small; and
determining a scene change by making a comparison between the calculated value of the evaluation function and a threshold value.

15. The moving image processing method according to claim 14, further comprising:
collecting a scene change interval, and
wherein the evaluation function which includes the scene change interval as a parameter is calculated in the calculating.

16. The moving image processing method according to claim 14, wherein the first information about a motion vector for each frame is collected from first header information, which is added in units of frames of the compressed moving image data, and second header information, which is added in units of constituent elements of the frame, without decoding an image of the frame in the collecting first information.

17. The moving image processing method according to claim 14, wherein the second information about a correlation with a frame preceding/succeeding each frame is collected from first header information, which is added in units of frames of the compressed moving image data, and second header information, which is added in units of constituent elements of the frame, without decoding an image of the frame in the collecting second information.

18. The moving image processing method according to claim 14, wherein the evaluation function calculated in the calculating includes, as a parameter, the number of bidirectionally predicted regions having both a forward prediction motion vector and a backward prediction motion vector in each frame within the frame group.

19. The moving image processing method according to claim 14, further comprising:
collecting an appearance interval of a frame that becomes a scene change within a frame group which satisfies a condition that the numbers of bidirectionally predicted regions in consecutive frames are small, and
wherein the evaluation function calculated in the calculating includes the appearance interval of the frame as a parameter.

20. The moving image processing method according to claim 14, wherein the first information is the number and magnitudes of motion vectors, whereas the second information is a square measure of a region having a low correlation with a preceding/succeeding frame.

21. A computer-readable storage medium on which is recorded a program for causing a computer to execute a process, said process comprising:
collecting first information about a motion vector for each frame from moving image data which is compressed with inter-frame prediction encoding;
collecting second information about a correlation with a preceding/succeeding frame without decoding an image for each frame;
calculating a value of an evaluation function which includes the first and the second information as parameters only for a frame within a frame group which satisfies a condition that the numbers of bidirectionally predicted regions in consecutive frames are small; and
determining a scene change by making a comparison between the calculated value of the evaluation function and a threshold value.

22. A moving image processing device, comprising:
information collecting means for collecting first information about a motion vector for each frame from moving image data which is compressed with inter-frame prediction encoding, and for collecting second information about a correlation with a preceding/succeeding frame without decoding an image for each frame;

evaluation function calculating means for calculating a value of an evaluation function which includes the first and the second information collected by said information collecting means as parameters only for a frame within a frame group which satisfies a condition that the numbers of bidirectionally predicted regions in consecutive frames are small; and scene change determining means for determining a scene change by making a comparison between the value of the evaluation function, which is calculated by said evaluation function calculating means, and a threshold value.

* * * * *